US011681195B2

(12) United States Patent
Yashiro et al.

(10) Patent No.: US 11,681,195 B2
(45) Date of Patent: Jun. 20, 2023

(54) LAMINATED STRUCTURE, MULTIPLE LAMINATED STRUCTURE, LENS, AND METHOD FOR PRODUCING LAMINATED STRUCTURE

(71) Applicant: Ricoh Company, Ltd., Tokyo (JP)

(72) Inventors: Tohru Yashiro, Kanagawa (JP); Kohji Takeuchi, Kanagawa (JP); Yasuhiro Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 470 days.

(21) Appl. No.: 16/820,202

(22) Filed: Mar. 16, 2020

(65) Prior Publication Data

US 2020/0301229 A1 Sep. 24, 2020

(30) Foreign Application Priority Data

Mar. 20, 2019 (JP) ............................ JP2019-053735
Mar. 3, 2020 (JP) ............................ JP2020-035506

(51) Int. Cl.

| | |
|---|---|
| ***B32B 3/10*** | (2006.01) |
| ***G02F 1/157*** | (2006.01) |
| ***B29D 11/00*** | (2006.01) |
| ***B32B 27/08*** | (2006.01) |
| ***B32B 27/36*** | (2006.01) |
| *B29K 69/00* | (2006.01) |

(52) U.S. Cl.
CPC ........ *G02F 1/157* (2013.01); *B29D 11/00009* (2013.01); *B32B 27/08* (2013.01); *B32B 27/365* (2013.01); *B29K 2069/00* (2013.01); *B32B 2250/05* (2013.01); *B32B 2307/20* (2013.01); *B32B 2551/00* (2013.01)

(58) Field of Classification Search
None
See application file for complete search history.

(56) References Cited

U.S. PATENT DOCUMENTS 10,495,937 B2 12/2019 Yashiro et al.
2011/0134655 A1 6/2011 Ohtani et al.
2017/0329198 A1 11/2017 Matsuoka et al.
(Continued)

FOREIGN PATENT DOCUMENTS

JP 63-000906 1/1988
JP 02-276630 11/1990
(Continued)

OTHER PUBLICATIONS

Extended European Search Report dated Jul. 22, 2020 in Japanese Patent Application No. 20162795.7, citing documents AA and AO therein, 8 pages.

*Primary Examiner* — Christopher M Polley
(74) *Attorney, Agent, or Firm* — Xsensus LLP

(57) ABSTRACT

A laminated structure including: an electrically conductive layer; an underlying layer including a first resin and inorganic particles; a support including a second resin; and a resin layer including a third resin that is at least one selected from the group consisting of a resin of same kind as the second resin and a resin having a softening temperature equal to or lower than a softening temperature of the second resin, the electrically conductive layer, the underlying layer, the support, and the resin layer being disposed in this order.

17 Claims, 12 Drawing Sheets

(56) References Cited

U.S. PATENT DOCUMENTS

2017/0329199 A1 11/2017 Yashiro et al.
2017/0338003 A1 11/2017 Haishi et al.
2018/0017835 A1* 1/2018 Kim ........................ G02C 7/101
2018/0044581 A1 2/2018 Sagisaka et al.
2018/0314125 A1 11/2018 Goto et al.
2019/0184694 A1 6/2019 Yashiro et al.
2019/0227401 A1 7/2019 Yutani et al.

FOREIGN PATENT DOCUMENTS

JP 2013-226815 11/2013
JP 5409094 B2 11/2013
JP 2017-26750 A 2/2017
JP 2019-107888 7/2019

* cited by examiner

151

LAMINATED STRUCTURE, MULTIPLE LAMINATED STRUCTURE, LENS, AND METHOD FOR PRODUCING LAMINATED STRUCTURE

CROSS-REFERENCE TO RELATED APPLICATIONS

The present application claims priority under 35 U.S.C. § 119 to Japanese Patent Application No. 2019-053735 filed Mar. 20, 2019 and Japanese Patent Application No. 2020-035506 filed Mar. 3, 2020. The contents of which are incorporated herein by reference in their entirety.

BACKGROUND OF THE INVENTION

Field of the Invention

The present disclosure relates to a laminated structure, a multiple laminated structure, a lens, and a method for producing the laminated structure.

Description of the Related Art

As a technique for decorating the surface of a plastic product, the insert molding technique using a decorative film has been known. In this technique, a decorative film that has been formed in advance is set on an injection molding mold. Then, a resin is injected to the back of the decorative film for welding to thereby integrally mold a plastic product including the decorative film on the surface thereof.

The insert molding technique can achieve higher productivity of products compared to a system where a decorative film is pasted to a surface of a product. Therefore, the insert molding technique has been applied in producing, for example, interior components of cars and smartphone covers.

In recent years, an attempt to produce electronic devices such as touch panels and displays for wearable application has been done by performing the insert molding using a material including an electrically conductive layer as an insert sheet that corresponds to the decorative film. In such electronic devices, use of a material having a high translucency (transparency) as the electrically conductive layer may be preferable in some cases depending on application of the electronic devices.

Materials of such an electrically conductive layer having translucency are, for example, transparent inorganic oxides such as indium oxide, carbons (e.g., CNT and graphene), metal nanowires, metallic grids, and electrically conductive polymers.

As the inorganic oxides that can be used as the electrically conductive layer, those described in Japanese Unexamined Patent Application Publication Nos. 63-906 and 2-276630 have been known.

In addition, the technique for forming an electrically conductive layer including, for example, a metallic nanomaterial and carbon nanotubes has also been known (see, for example, Japanese Patent No. 5409094).

Regarding the wearable applications, in some cases, the electronic device preferably may have a light weight and difficulty in being cracked, and preferably may have a three-dimensional shape such as a curved surface shape that is excellent in design and fitting ability.

As a substrate (support) of the insert sheet in forming a product having a three-dimensional shape such as a curved surface shape using the insert molding technique, the technique using a material having a high stretchability during heating and molding and being excellent in formativeness has been known (see, for example, Japanese Unexamined Patent Application Publication No. 2013-226815).

SUMMARY OF THE INVENTION

According to one aspect of the present disclosure, a laminated structure includes: an electrically conductive layer; an underlying layer including a first resin and inorganic particles; a support including a second resin; and a resin layer including a third resin that is at least one selected from the group consisting of a resin of same kind as the second resin and a resin having a softening temperature equal to or lower than a softening temperature of the second resin. The electrically conductive layer, the underlying layer, the support, and the resin layer are disposed in this order.

DESCRIPTION OF THE EMBODIMENTS (Laminated Structure)

Figure 1A:
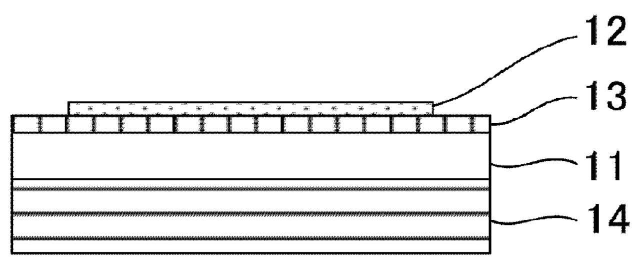
FIG. 1A is a schematic side view presenting one example of an electrically conductive transparent substrate according to the first embodiment.

A laminated structure of the present disclosure includes an electrically conductive layer, an underlying layer, a support, and a resin layer, preferably includes at least one selected from the group consisting of an adhesive layer, an electronic material layer, and a seal member, and further includes other members if necessary.

The laminated structure of the present disclosure is based on the finding that the electrically conductive layer may be damaged in a high temperature environment in the conventionally existing laminated structures.

The coating in a decorative film used for insert molding is applied to a film having a flat plate shape. Therefore, the coating in a decorative film is low-cost compared to the case where a surface of a product having a three-dimensional shape such as a curved surface shape is coated because it does not require leased facilities. Furthermore, the dipping coating as a countermeasure for coating step portions is not required, and thus the amount of a coating solvent is small, which is advantageous.

As described above, it is possible to achieve mass production with high productivity at a low cost by producing an electronic device through insert molding.

However, the conventional insert molding technique has the following problem. Specifically, for example, a resin material having the same as a resin material forming the resin substrate is injected and welded to a resin substrate (support) on which an electrically conductive layer is formed at a high temperature (e.g., about 200° C.). Therefore, an electronic device is easily broken due to heat or shearing force of the injected resin. More specifically, the conventional insert molding technique has the problem that deformation of the resin substrate due to heat causes cracks (fissures) in the electrically conductive layer formed on the resin substrate, which may result in damage to the electrically conductive layer.

As one example of the conventional techniques, the case where the insert molding is performed using an insert sheet obtained by forming an electrically conductive layer formed of an inorganic oxide as described in Japanese Unexamined Patent Application Publication Nos. 63-906 and 2-276630 on a resin substrate having a high stretchability during heating and molding and being excellent in formativeness as described in Japanese Unexamined Patent Application Publication No. 2013-226815 will be discussed. In this case, because the electrically conductive layer formed of the inorganic oxide has a large Young's modulus and no toughness, it has weakness and is easily broken. Therefore, the electrically conductive layer formed of the inorganic oxide cannot adapt to thermal expansion of the resin substrate during molding and it is difficult to mold and process it without causing crack damage.

Moreover, when a functional layer such as an organic electronic material layer is molded and processed on the electrically conductive layer of the inorganic oxide, distortion caused in the electrically conductive layer is transmitted to the functional layer to thereby easily cause larger distortion in the functional layer. Furthermore, in the case where the electrically conductive layer is disposed in a plurality of divisional portions; e.g., the case where a thin film transistor (TFT) is disposed in the form of matrix and a functional layer is disposed thereon, when mechanical characteristics are ununiform in the electrically conductive layer, variation in distortion of the functional layer easily becomes large and variation in performance of the functional layer easily becomes large.

In addition, the laminated structure in the conventional technique has a problem that the electrically conductive layer may cause cracks (damage) due to, for example, thermal expansion of the resin substrate not only when the laminated structure is produced through the insert molding but also when the laminated structure is exposed to a high temperature environment after production.

When the electrically conductive layer that is formed of, for example, a metallic nanomaterial and carbon nanotubes as described in Japanese Patent No. 5409094 is comprehensively judged in terms of transparency (light transmittance and haze), electric conductivity, and durability, the performance thereof as the electrically conductive layer is inferior to the electrically conductive layer of the inorganic oxide, and is not sufficient.

Therefore, as described above, the laminated structure in the conventional technique has the following problem. Specifically, in the case where an electrically conductive layer excellent in transparency and electric conductivity is used, when it is exposed to a high temperature environment during production through the insert molding, the electrically conductive layer may be damaged due to deformation caused by, for example, thermal expansion of the support such as the resin substrate.

Here, the laminated structure of the present disclosure includes: an electrically conductive layer; an underlying layer including a first resin and inorganic particles; a support including a second resin; and a resin layer including a third resin that is at least one selected from the group consisting of a resin of the same kind as the second resin and a resin having a softening temperature equal to or lower than a softening temperature of the second resin, the electrically conductive layer, the underlying layer, the support, and the resin layer being disposed in this order.

In the present disclosure, when a third resin to become a resin layer is injected into an insert sheet including, for example, the electrically conductive layer, the underlying layer, and the support to perform the insert molding, the third resin is at least one selected from the group consisting of a resin of the same kind as the second resin and a resin having a softening temperature equal to or lower than a softening temperature of the second resin, and therefore the support is softened than the resin layer to a less extent under a high temperature environment. In the present disclosure, since the underlying layer includes the first resin and the inorganic particles, the underlying layer is thermally expanded than the support to a less extent. As a result, even when the underlying layer that is in contact with the electrically conductive layer is exposed to a high temperature environment at the time when the third resin of which the resin layer is formed is injected, thermal deformation due to a change in temperatures is prevented. Therefore, in the present disclosure, stress (for example, shearing stress) to be applied to the electrically conductive layer due to deformation of the underlying layer can be small, which makes it possible to prevent damage such as occurrence of cracks in the electrically conductive layer.

In the laminated structure of the present disclosure, the third resin is at least one selected from the group consisting of a resin of the same kind as the second resin and a resin having a softening temperature equal to or lower than a softening temperature of the second resin, and the underlying layer that is in contact with the electrically conductive layer includes the first resin and the inorganic particles. Therefore, the underlying layer is thermally expanded to a less extent. Therefore, when the laminated structure is used in a high temperature environment, deformation of the underlying layer can be small to thereby decrease stress to be applied to the electrically conductive layer.

Therefore, in the present disclosure, even when an electrically conductive layer excellent in transparency and electric conductivity is used during the production and usage, it is possible to prevent damage to the electrically conductive layer in a high temperature environment.

An object of the present disclosure is to provide a laminated structure that can prevent damage to an electrically conductive layer in a high temperature environment.

According to the present disclosure, it is possible to provide a laminated structure that can prevent damage to an electrically conductive layer in a high temperature environment.

<Electrically Conductive Layer>

The electrically conductive layer is not particularly limited and may be appropriately selected depending on the intended purpose, so long as it has electric conductivity. For example, the electrically conductive layer may be an article that can drive an electronic device by application of voltage or may be an article that can generate heat by adjusting a resistance value and functions as a part of a heater.

The electrically conductive layer may be divided into a plurality of portions. A form of the electrically conductive layer when the electrically conductive layer is divided into a plurality of portions is not particularly limited and may be appropriately selected depending on the intended purpose. For example, the form may be bisection or may be such a form that a plurality of TFTs (thin film transistor) are arranged in the form of matrix such as known displays.

A material of the electrically conductive layer is not particularly limited and may be appropriately selected depending on the intended purpose. The material thereof may be an opaque material or may be a transparent material, but is preferably a transparent material.

Examples of the opaque material include, but are not limited to, metallic materials (metal materials) such as Au, Ag, Cu, Al, Ni, W, and Mo.

Examples of the transparent material include, but are not limited to, inorganic oxides, carbons (e.g., CNT and graphene), metal nanowires, metallic grids, and electrically conductive polymers. Among them, an inorganic oxide is preferable because it has electric conductivity as a compact film and is excellent in terms of electric conductivity, transparency (transmittance and haze), and reliability.

The inorganic oxide is not particularly limited and may be appropriately selected depending on the intended purpose. For example, a material including an oxide material such as In, Sn, Zn, or Al can be used. Example of an addition material in the electrically conductive layer including the inorganic oxide include, but are not limited to, W, Ti, Zr, Zn, Sb, Ga, Ge, and F.

The electrically conductive layer including the inorganic oxide preferably includes indium oxide. By controlling crystallinity of indium oxide, it is possible to obtain an electrically conductive transparent layer that hardly causes damage such as cracks during heating processing.

Specifically, the electrically conductive layer including the inorganic oxide is preferably one including indium oxide where an H/W value of a crystal peak at the (222) surface is 5.7 or less.

In the XRD (X-ray diffraction), a crystal peak at the (222) surface of indium oxide is detected near $2\theta=32$ (deg.). When the crystal peak at the (222) surface has an H/W value of 5.7 or less, crystallinity is not excessively high, and occurrence of cracks generated from the crystalline boundary of the electrically conductive layer can be prevented.

For example, measurement conditions of the H/W value are preferably as follows: radiation source: Cu tubular lamp, 50 kV, 1000 μm; an angle of incidence: 3°; a slit width: 1 mm; and a collimator diameter: 1 mm.

In addition to the indium oxide, the electrically conductive layer may include another oxide such as tin (Sn), tungsten (W), titanium (Ti), zirconium (Zr), zinc (Zn), aluminum (Al), antimony (Sb), gallium (Ga), and fluorine (F) alone or in combination. Inclusion of such another oxide makes it possible to improve carrier density and mobility of indium oxide.

In this case, those including tin-doped indium oxide (hereinafter will be referred to as "ITO") are particularly preferable as the electrically conductive layer.

An amount of another oxide in the electrically conductive layer is not particularly limited and may be appropriately selected depending on the intended purpose. The amount thereof is preferably 80% by mass or less. In addition, as another oxide, tin oxide and zirconium oxide are preferable particularly in terms of electric conductivity, and the amount thereof in the electrically conductive layer is particularly preferably 15% by mass or less, for example.

An average thickness of the electrically conductive layer is not particularly limited and may be appropriately selected depending on the intended purpose. However, the average thickness thereof is preferably adjusted depending on amperage required for an electronic device. Specifically, the average thickness thereof is preferably 50 nm or more but 500 nm or less, more preferably 200 nm or less. When the average thickness of the electrically conductive layer satisfies the above preferable range, it is possible to prevent occurrence of damage such as cracks when a curved surface is formed and processed.

For example, a sheet resistance of the electrically conductive layer is not particularly limited and may be appropriately selected depending on the intended purpose. However, the sheet resistance thereof is preferably 300 Ω/square or less.

The transmittance of visible rays in the electrically conductive layer is not particularly limited and may be appropriately selected depending on the intended purpose. However, the transmittance can be appropriately adjusted by changing an average thickness of the electrically conductive layer or an oxygen ratio in the inorganic oxide such as indium oxide. The transmittance of visible rays in the electrically conductive layer is preferably 70% or more.

Here, the electrically conductive layer may include an electrically conductive transparent material excellent in elasticity such as carbon (e.g., carbon nanotubes (CNT) and graphene), metal nanowire, metallic grid, or an electrically conductive polymer. Moreover, a composite layer including a layer of the electrically conductive transparent material and an inorganic oxide layer may be used.

The electrically conductive layer can be formed through, for example, the vacuum film formation method. The crystallinity of the indium oxide layer; i.e., the H/W value of the crystal peak can be adjusted by, for example, a temperature of a substrate, a film formation speed, and a gas pressure during the vacuum film formation. In addition, a heating treatment after the film formation is effective in adjustment of the H/W value. Examples of the vacuum film formation method include, but are not limited to, the vacuum deposition method, the sputtering method, the ion plating method, and the chemical vapor deposition (CVD) method. Among them, the sputtering method is preferable because a film can be formed at a high speed. In the case of the sputtering method, the H/W value of the crystal peak can be easily controlled by adjusting sputtering power.

<Underlying Layer>

The underlying layer is a layer including a first resin and inorganic particles.

When the underlying layer includes the inorganic particles, a coefficient of thermal expansion of the underlying layer can be suppressed compared to general underlying layers formed of a resin alone. This makes it possible to suppress thermal expansion of the underlying layer during heating processing on a surface on which the electrically conductive layer is formed (surface that is in contact with the electrically conductive layer). Therefore, occurrence of cracks and therefore damages in the electrically conductive layer can be prevented.

More specifically, for example, a coefficient of thermal expansion of the underlying layer at the time of heating is preferably smaller than a coefficient of thermal expansion of the second resin of which the below-described support is formed and a coefficient of thermal expansion of the third resin of which the below-described resin layer is formed at the time of heating. This makes it possible to suppress thermal deformation on the surface on which the electrically conductive layer is formed at the time of heating processing. Therefore, even when the electrically conductive layer formed of a material having a large Young's modulus (e.g., an inorganic oxide) is formed, cracks hardly occur.

A softening temperature of the first resin included in the underlying layer is preferably 100° C. or more. When the softening temperature of the first resin included in the underlying layer is 100° C. or more, it is possible to suppress thermal expansion of the surface on which the electrically conductive layer is formed (surface that is in contact with the electrically conductive layer) at the time of heating. Therefore, occurrence of cracks and therefore damages in the electrically conductive layer can be prevented.

The softening temperature of the first resin included in the underlying layer is particularly preferably equal to or higher than a softening temperature of the third resin included in the resin layer. When the softening temperature of the first resin included in the underlying layer is equal to or higher than the softening temperature of the third resin included in the resin layer, damages of the electrically conductive layer in a high temperature environment at the time of the production can be more prevented.

The first resin included in the underlying layer is not particularly limited and may be appropriately selected depending on the intended purpose. Examples thereof include ultraviolet (UV) curable resin materials and thermosetting resin materials. Examples of the first resin included in the underlying layer include acrylic resins, epoxy resins, urethane resins, silicone resins, and melamine resins. These materials are preferable in terms of moldability, transparency, and cost. That is, the first resin preferably includes at least one selected from the group consisting of acrylic resins, epoxy resins, urethane resins, silicone resins, and melamine resins in terms of moldability, transparency, and cost. The first resin included in the underlying layer is preferably a cured material of an oligomer having a plurality of unit structures with respect to a reactive group. When the first resin included in the underlying layer is a monomer having a single unit structure with respect to a reactive group, its cured material may have cracks in the underlying layer at the time of heating processing. The first resin included in the underlying layer is preferably an oligomer having a plurality of unit structures with respect to a reactive group because its cured material may have high flexibility than a cured material of a monomer and cracks hardly occur.

—Inorganic Particles—

The inorganic particles in the underlying layer are not particularly limited and may be appropriately selected depending on the intended purpose. For example, generally used inorganic fillers may be used. More specifically, examples of the inorganic particles include silicon oxide, zirconia oxide, aluminum oxide, tin oxide, various micas, Ag, Cu, Au, and Ni. These may be used alone or in combination.

A number average particle diameter of a primary particle diameter of the inorganic particles is not particularly limited and may be appropriately selected depending on the intended purpose. The number average particle diameter thereof is preferably 1 nm or more but 50 μm or less, more preferably 1 nm or more but 100 nm or less. When the number average particle diameter of the primary particle diameter of the inorganic particles is 1 nm or more but 100 nm or less, transparency of the underlying layer can be secured.

An amount of the inorganic particles in the underlying layer is not particularly limited and may be appropriately selected depending on characteristics of the underlying layer (e.g., transparency, film thickness, and coefficient of thermal expansion). For example, the amount thereof is preferably 10% by mass or more, more preferably 10% by mass or more but 200% by mass or less, relative to the total amount of the first resin. When the amount of the inorganic particles in the underlying layer is 10% by mass or more relative to the total amount of the first resin, an effect of suppressing thermal expansion can be improved, and when the amount thereof is 10% by mass or more but 200% by mass or less, a smooth underlying layer can be obtained, which is preferable.

A thickness of the underlying layer is not particularly limited and may be appropriately selected depending on the intended purpose. For example, the thickness thereof can be, for example, 0.1 μm or more but 50 μm or less.

The transmittance of visible rays of the underlying layer is preferably 70% or more.

A softening temperature and a coefficient of thermal expansion of the underlying layer can be adjusted by changing, for example, kinds of the first resin and the inorganic material used in the underlying layer, the amounts thereof, crosslink density, and an amount of a reaction initiator.

The softening temperature of the first resin can be measured through, for example, thermomechanical analysis (Thermo Mechanical Analysis: TMA, Dynamic Mechanical Analysis: DMA, Differential scanning calorimetry: DSC). The coefficient of thermal expansion of the first resin can be measured through, for example, thermomechanical analysis (Thermo Mechanical Analysis: TMA). An apparatus of the thermomechanical analysis is, for example, a TMA apparatus (Thermo plus EVO II, available from Rigaku Corporation).

Here, in the present disclosure, the "softening temperature" means a temperature measured under the following conditions.

As the measurement conditions of the softening temperature in the present disclosure, changes of characteristics (weight, amount of heat, expansion amount, dynamic viscoelasticity, and temperature) at the time of heating at a heating rate of from 5° C./min through 20° C./min are measured, and using a point of inflection is more preferable. The DSC measurement is according to the JIS K7121.

A second resin and a third resin, which will be described hereinafter, can be measured for a softening temperature in the same manner as described above. Hereinafter, the measurement conditions of the softening temperature are the same as those described above.

The coefficient of thermal expansion in the present disclosure is measured using a TMA apparatus under the following conditions.

Tensile load: 20 mN

Temperature range: Room temperature through 160° C.

Heating rate: 5° C./min

Sample shape for measurement: Width: 5 mm×length 20 mm×depth: 0.3 mm

Figure 14:
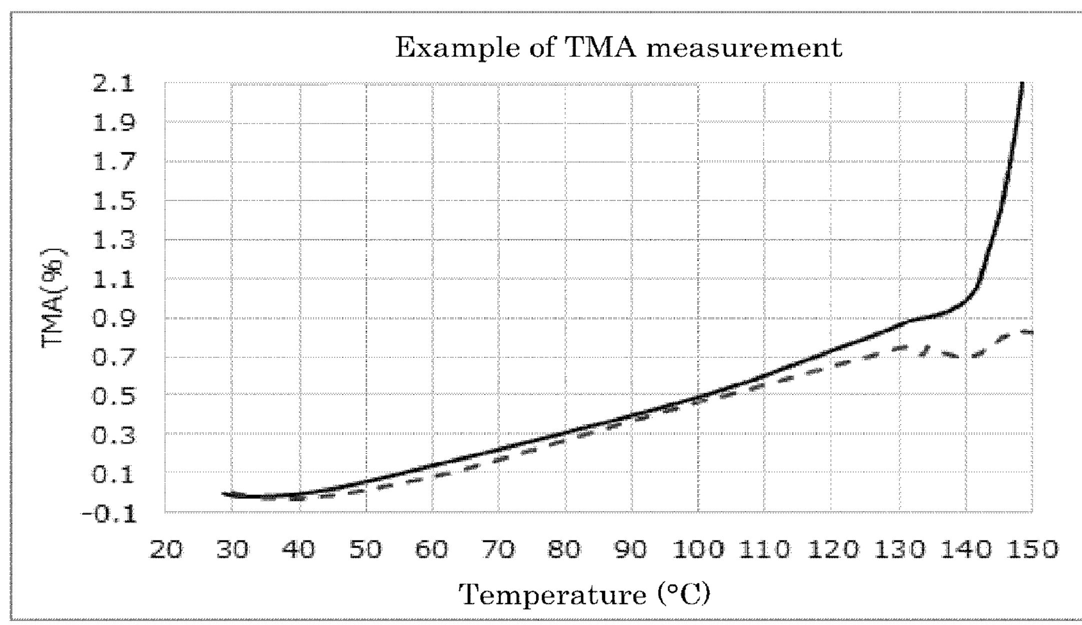
FIG. 14 is a view presenting one example of measurement of a coefficient of thermal expansion using a thermo mechanical analysis (TMA) apparatus.

Here, regarding measurement of the coefficient of thermal expansion using a TMA apparatus under the aforementioned conditions, an example of measurement of polycarbonate that can be used as the second resin (support) is presented in FIG. 14. In FIG. 14, the solid line indicates the second resin (support), and the dashed line indicates the second resin (support) on which the underlying layer is formed.

The underlying layer is a thin film. Therefore, when it is difficult to measure the underlying layer, the second resin (support, a layer including $SiO_2$ (average particle diameter: 10 nm to 15 nm) and an epoxy acrylate cured material as the underlying layer in FIG. 14) on which the underlying layer is formed is measured, and an effect of suppressing thermal expansion can be confirmed by comparing the second resin on which the underlying layer is formed with the second resin (support) alone.

A method for forming the underlying layer is not particularly limited and may be appropriately selected depending on the intended purpose. For example, the underlying layer can be formed by coating, on a support, a material obtained by mixing: an inorganic material and a material including at least an organic monomer material including a reaction group and an initiator, and then subjecting it to a curing treatment such as UV irradiation, a thermal treatment, or a dehydration treatment.

As the coating method, for example, various printing methods such as the spin coating method, the casting method, the micro gravure coating method, the gravure coating method, the bar coating method, the roll coating method, the wire bar coating method, the clip coating method, the slit coating method, the capillary coating method, the spray coating method, the nozzle coating method, the gravure printing method, the screen printing method, the flexographic printing method, the offset printing method, the reverse printing method, and the ink jet printing method can be used.

Note that, formation of the underlying layer is not limited to a region between the electrically conductive layer and the support. Preferably, another underlying layer is further provided between, for example, the support and the resin layer. That is, preferably, the laminated structure of the present disclosure further includes another underlying layer between the support and the resin layer. This makes it possible to prevent damage to the electrically conductive layer during heating processing. When the underlying layer is provided between the support and the resin layer, an adhesion layer is preferably formed between the underlying layer and the resin layer in terms of improvement in adhesiveness with the resin layer. Note that, the underlying layer between the electrically conductive layer and the support and the underlying layer between the support and the resin layer may not be the same, and the material, the formulation, and the thickness of each underlying layer are preferably adjusted depending on applications.

<Support>

The support includes a second resin and further includes other materials if necessary.

The second resin in the support is not particularly limited and may be appropriately selected depending on the intended purpose. Examples thereof include, but are not limited to, known thermoplastic resins.

Examples of the thermoplastic resin include, but are not limited to, polycarbonate, polyethylene terephthalate, polyethylene naphthalate, acryl(polymethyl methacrylate), polyvinyl chloride, polyvinylidene chloride, polyvinyl alcohol, polystyrene, styrene acrylonitrile copolymer, styrene butadiene acrylonitrile copolymer, polyethylene, ethylene vinyl acetate copolymer, polypropylene, polyacetal, cellulose acetate, polyamide (nylon), polyurethane, and fluorine-based products (Teflon (registered trademark)).

Preferably, the second resin in the support is formed of a material including at least one selected from the group consisting of polycarbonate, polyethylene terephthalate, polybutylene terephthalate, polymethyl methacrylate, polyethylene, polypropylene, acrylonitrile•butadiene•styrene (PBS), polyoxymethylene, polyolefin, and urethane, or is formed of a copolymerized material of the foregoing, in terms of moldability. In addition, these materials are suitable as an injection molding material that will be described hereinafter, and thus are excellent in welding property with the resin of which the resin layer is formed. Furthermore, among them, polycarbonate or polyethylene terephthalate is more preferable.

When a relationship between resins is represented, such resins that are classified into the same category may be referred to as the "same kind" of the resin. Examples of the category include polycarbonate, polyester, acrylic resins, polyethylene, polypropylene, PBS, polyacetal, polyolefin, and urethane resins.

A softening temperature of the second resin is not particularly limited and may be appropriately selected depending on the intended purpose so long as it is equal to or higher than a softening temperature of a third resin that will be described hereinafter. For example, the softening temperature thereof is preferably 80° C. or more but 300° C. or less, more preferably 100° C. or more but 200° C. or less.

The transmittance of visible rays of the support is preferably 70% or more.

In the case where a plurality of the supports are provided and the laminated structure is visually seen from one side, the transmittance of visible rays of one support is 70% or more and another support may be opaque.

An average thickness of the support is not particularly limited and may be appropriately selected depending on the intended purpose. For example, the average thickness thereof is preferably 0.03 mm or more but 5.0 mm or less because formation of a curved surface is facilitated.

<Resin Layer>

The resin layer includes a third resin that is at least one selected from the group consisting of a resin of the same kind as the second resin and a resin having a softening temperature equal to or lower than a softening temperature of the second resin, and further includes other materials if necessary.

An interface between the resin layer and the support can be welded or attached through various methods such as injection molding, ultrasonic welding, laser welding, heat welding, vibration welding, and cast molding. However, injection molding and cast molding that integrally mold a product are preferable in terms of productivity. More specifically, for example, an electrically conductive substrate as an insert sheet including the electrically conductive layer, the underlying layer, and the support is set on a molding mold, and a resin is injected or cast (casting) for insert molding, and therefore a resin layer is formed to thereby produce a laminated structure, which is preferable. In the cast molding, after an insert sheet is set on a molding mold, a curable resin is injected into a mold, and is thermally cured or photo-cured to be integrally molded.

A shape of the resin layer is not particularly limited and may be appropriately selected depending on the intended purpose. Examples thereof include, but are not limited to, planar parts, parts having a curved surface shape, and optical lenses. Among them, optical lenses are preferable. That is, the resin layer is preferably an optical lens. When the resin layer is an optical lens, the laminated structure of the present disclosure can be used as, for example, a lens of an eyeglass-type wearable device. In this case, when the laminated structure includes an electrochromic layer as an electronic material layer, the laminated structure of the present disclosure can be used as a lens of light-adjusting spectacles (light-adjusting sunglasses), which is particularly preferable.

The third resin in the resin layer is not particularly limited and may be appropriately selected depending on the intended purpose, as long as it is at least one selected from the group consisting of a resin of the same kind as the second resin and the resin having a softening temperature equal to or lower than a softening temperature of the second resin. Note that, the "same kind" of a resin is as described in the second resin. This makes it possible to improve welding strength between the support and the resin layer, to make refractive indexes of the support and the resin layer even, and to improve transparency (visibility) of the laminated structure.

Furthermore, the third resin in the resin layer is more preferably at least one selected from the group consisting of polycarbonate and polycarbonate copolymers in terms of moldability, transparency, and cost similarly to the material of the support.

As a material of the polycarbonate copolymer, copolymer materials including various different monomer components have been developed for the purpose of improving a refractive index of polycarbonate, decreasing double refraction, and imparting incombustibility. These commercially available polycarbonates, polycarbonate copolymers, and UV curable resins can be used. Examples of the commercially available polycarbonate include Iupilon CLS3400S (available from Mitsubishi Engineering-Plastics Corporation), Iupilon H-4000 (available from Mitsubishi Engineering-Plastics Corporation), AD5503 (available from TEIJIN LIMITED), L-1225LM (available from TEIJIN LIMITED), SH1126Z (available from TEIJIN LIMITED), Iupilon KH3310UR (available from Mitsubishi Engineering-Plastics Corporation), and TR-0601A (Sumika Polycarbonate Limited SD). Examples of the commercially available polycarbonate copolymer includes SP5570 (available from TEIJIN LIMITED), SP5580 (available from TEIJIN LIMITED), and SP1516 (available from TEIJIN LIMITED). Examples of the UV curable resin include SK6500 and SK3200 (available from Dexerials Corporation). Examples of the thermosetting resin include MR8, MR7, and MR10 (available from Mitsui Chemicals, Inc.).

Regarding a characteristic of the third resin in the resin layer, fluidity when it is in contact with the support during the production is preferably high. For example, a resin for injection molding preferably has a larger melt volume-flow rate determined according to ISO 1133. More specifically, a melt volume-flow rate of the resin of which the resin layer is formed is preferably 14 $cm^3$/10 min or more, the melt volume-flow rate being determined according to ISO 1133. In injection molding, as fluidity of the resin injected is higher, damage to an insert sheet (particularly, electrically conductive layer) due to shearing stress can be decreased. Therefore, when the melt volume-flow rate of the third resin in the resin layer is 14 $cm^3$/10 min or more, damage such as occurrence of cracks in the electrically conductive layer can be prevented.

A device for measuring the melt volume-flow rate of the resin which is determined according to ISO 1133 is, for example, MELT INDEXER F-F01 (available from Toyo Seiki Seisaku-sho, Ltd.) and MELT INDEXER D4003 (available from Dynisco Japan, Ltd.). The melt volume-flow rate of polycarbonate is generally determined under the conditions of measurement temperature of 300° C. and measurement load of 1.20 kgf.

For example, when it is difficult to obtain welding strength between the support and the resin layer at the time of welding or adhesion, an adhesion layer may be provided between the support and the resin layer.

<Adhesive Layer>

Preferably, the laminated structure of the present disclosure further includes an adhesive layer.

The adhesive layer is not particularly limited and may be appropriately selected depending on the intended purpose. Examples thereof include, but are not limited to, optical clear adhesive (OCA) tape and known adhesives (photocurable or thermosetting adhesives). Among them, OCA tape is preferable.

An average thickness of the adhesive layer is not particularly limited and may be appropriately selected depending on the intended purpose. However, the average thickness thereof is preferably 20 μm or more but 200 μm or less.

Preferably, in the laminated structure of the present disclosure, a surface of the adhesive layer further includes an electrically conductive layer. More specifically, preferably, two electrically conductive substrates each including the electrically conductive layer, the underlying layer, and the support are provided, the two substrates are pasted with each other via the adhesive layer so that the electrically conductive layers are faced with each other, and one support and the resin layer are welded or welding-processed to thereby form a laminated structure. This makes it possible to easily produce a laminated structure having two electrically conductive layers. Moreover, when an electronic material layer that will be described hereinafter is formed at a part of the region between the two electrically conductive layers, a laminated structure of an electronic device can be easily produced.

<Electronic Material Layer>

Preferably, the laminated structure of the present disclosure further includes an electronic material layer provided in contact with the electrically conductive layer and another electrically conductive layer provided in contact with the electronic material layer. That is, an embodiment including the aforementioned laminated structure, the electronic material layer provided in contact with the electrically conductive layer in the laminated structure, and another electrically conductive layer provided in contact with the electronic material layer is preferable in the present disclosure. This makes it possible to apply the laminated structure of the present disclosure to various uses depending on functions of the electronic material layer.

As another electrically conductive layer, the same as the electrically conductive layer in the aforementioned laminated structure of the present disclosure can be used.

The electronic material layer is not particularly limited and may be appropriately selected depending on the intended purpose, so long as it exhibits functions such as coloring, light emission, polarization of light, and deformation by application of electricity (voltage).

Examples of an electronic material included in the electronic material layer include, but are not limited to, electrochromic materials, electroluminescence materials, chemical luminescence materials, electrophoretic materials, electrowetting materials, liquid crystal materials, piezoelectric materials, electricity storage materials, and electrolytes. Among them, electrochromic materials are preferable. That is, the electronic material layer is preferably an electrochromic layer. This makes it possible to use the laminated structure of the present disclosure as, for example, light-adjusting spectacles (light-adjusting sunglasses), which is particularly preferable.

In the electronic material layer, an inorganic material such as inorganic nanoparticles may be mixed.

An average thickness of the electronic material layer is not particularly limited and may be appropriately selected depending on the intended purpose. However, the average thickness thereof is preferably 50 μm or less.

The electronic material layer is preferably a layer formed of an organic material that has durability to molding processing and is excellent in flexibility.

As the coating method for producing the electronic material layer, various printing methods such as the spin coating method, the casting method, the micro gravure coating method, the gravure coating method, the bar coating method, the roll coating method, the wire bar coating method, the clip coating method, the slit coating method, the capillary coating method, the spray coating method, the nozzle coating method, the gravure printing method, the screen printing method, the flexographic printing method, the offset printing method, the reverse printing method, and the ink jet printing method can be used.

<<Electrochromic Layer>>

The electrochromic layer includes an electrochromic material and further includes other components if necessary.

The electrochromic material is not particularly limited and may be appropriately selected depending on the intended purpose so long as it is a material exhibiting electrochromism. Examples thereof include, but are not limited to, inorganic electrochromic compounds, organic electrochromic compounds, and electrically conductive polymers.

The inorganic electrochromic compound is not particularly limited and may be appropriately selected depending on the intended purpose. Examples thereof include, but are not limited to, tungsten oxide, molybdenum oxide, iridium oxide, and titanium oxide.

The organic electrochromic compound is not particularly limited and may be appropriately selected depending on the intended purpose. Examples thereof include, but are not limited to, viologen, rare earth phthalocyanine, and styryl.

Examples of the electrically conductive polymer include, but are not limited to, polypyrrole, polythiophene, polyaniline, and derivatives thereof.

The electrochromic layer preferably has such a structure that electrically conductive or semiconducting fine particles bear an organic electrochromic compound. Specifically, it is preferable to have such a structure that fine particles having a particle diameter of from about 5 nm through about 50 nm are bound to the surface of the electrode and an organic electrochromic compound including phosphonic acid or a polar group such as a carboxyl group or a silanol group is adsorbed on the surfaces of the fine particles. This structure can improve responsiveness compared to the conventional electrochromic apparatuses because a large surface effect of the fine particles is used to effectively inject electrons into the organic electrochromic compound. Furthermore, it is possible to form a transparent film as a display layer by using the fine particles. Therefore, a high color optical density of the electrochromic compound can be obtained.

In addition, as the electrochromic layer, it is possible to bear a plurality of organic electrochromic compounds on the electrically conductive or semiconducting fine particles. The electrically conductive particles can also provide electrical conductivity of the electrode layer.

Examples of polymer-based and dye-based electrochromic compounds include, but are not limited to, low molecular organic electrochromic compounds such as azobenzene-based compounds, anthraquinone-based compounds, diarylethene-based compounds, dihydroprene-based compounds, dipyridine-based compounds, styryl-based compounds, styryl spiropyran-based compounds, spirooxazine-based compounds, spirothiopyran-based compounds, thioindigo-based compounds, tetrathiafulvalene-based compounds, terephthalic acid-based compounds, triphenylmethane-based compounds, benzidine-based compounds, triphenylamine-based compounds, naphthopyran-based compounds, viologen-based compounds, pyrazoline-based compounds, phenazine-based compounds, phenylenediamine-based compounds, phenoxazine-based compounds, phenothiazine-based compounds, phthalocyanine-based compounds, fluoran-based compounds, fulgide-based compounds, benzopyran-based compounds, and metallocene-based compounds; and electrically conductive polymer compounds such as polyaniline and polythiophene. These may be used alone or in combination.

Preferably, the electrochromic layer includes two electrochromic portions, one electrochromic portion is the first electrochromic portion including an electrochromic material that can develop colors in the oxidation state, and the other electrochromic portion is the second electrochromic portion including an electrochromic material that can develop colors in the reduction state. Details of this embodiment will be described hereinafter.

An average thickness of the electrochromic layer is not particularly limited and may be appropriately selected depending on the intended purpose. However, the average thickness is preferably 0.2 μm or more but 5.0 μm or less. When the average thickness of the electrochromic layer is 0.2 μm or more, color optical density can be improved. When the average thickness of the electrochromic layer is 5.0 μm or less, production cost can be decreased and transparency in the decoloring state can be high, which makes it possible to improve visibility.

The electrochromic layer is preferably formed by coating an electrochromic material dissolved in a solvent to form a film, and then allowing it to polymerize through light or heat. Examples of the coating method include, but are not limited to, various printing methods such as the spin coating method, the casting method, the micro gravure coating method, the gravure coating method, the bar coating method, the roll coating method, the wire bar coating method, the dip coating method, the slit coating method, the capillary coating method, the spray coating method, the nozzle coating method, the gravure printing method, the screen printing method, the flexographic printing method, the offset printing method, the reverse printing method, and the ink jet printing method.

<<<Solid Electrolyte Portion>>>

The electrochromic layer in the laminated structure of the present disclosure preferably includes two electrochromic portions as described above. In this case, the electrochromic layer preferably includes an electrochromic portion and a solid electrolyte portion, and preferably includes a solid electrolyte portion between two electrochromic portions.

Here, the electrochromic portion means a portion including the electrochromic material and the solid electrolyte portion means a portion formed of a solid electrolyte.

The solid electrolyte portion is preferably formed as a film obtained by holding an electrolyte in a photocurable or thermosetting resin. Moreover, inorganic particles for controlling a film thickness of the electrolyte portion are preferably mixed.

The solid electrolyte portion is preferably formed by coating, on the electrochromic portion, a solution obtained by mixing the inorganic fine particles, the curable resin, and the electrolyte, and then curing the solution through light or heat to thereby a film. Alternatively, the solid electrolyte portion can be formed by forming a porous inorganic fine particle layer in advance, coating a solution obtained by mixing a curable resin and an electrolyte so as to permeate through the inorganic fine particles, and then curing the solution through light or heat to thereby form a film.

Furthermore, when the electrochromic portion is a layer in which the electrochromic compound is born on the electrically conductive or semiconducting nanoparticles, it is possible to form a film by coating a solution obtained by mixing the curable resin and the electrolyte so as to permeate through the electrochromic portion, and then curing the solution through light or heat.

As the electrolyte in the solid electrolyte portion, for example, a liquid electrolyte such as an ionic liquid or a solution obtained by dissolving a solid electrolyte in a solvent is used. An electrochromic material can be mixed in the solid electrolyte portion.

An average thickness of the solid electrolyte portion is not particularly limited and may be appropriately selected depending on the intended purpose. The average thickness thereof is preferably 5 μm or more but 500 μm or less, more preferably 10 μm or more but 100 μm or less. When the average thickness of the solid electrolyte portion satisfies within the aforementioned preferable range, it is possible to prevent short circuit of electric current and to decrease production cost.

<Seal Member>

Preferably, the laminated structure of the present disclosure further includes a seal member.

The seal member is not particularly limited and may be appropriately selected depending on the intended purpose.

The seal member is formed so as to physically and chemically protect, for example, a surface or a side portion of the laminated structure. When two laminated structures are pasted with each other to form a multiple laminated structure, the seal member is preferably disposed between the two laminated structures. When the seal member is formed between the two laminated structures, the seal member seals a surface (periphery) of a layer to be sealed that is sealed by the seal member together with the laminated structures.

The seal member can be formed by coating, for example, a photocurable or thermosetting insulating resin so as to cover at least one of a side surface or a top surface of the laminated structure, and then curing the insulating resin. Preferably, the seal member is thermally expanded than the support to a less extent, and includes the first resin and the inorganic particles similarly to the underlying layer, in order to suppress damage of the seal member at the time of heat welding.

A thickness of the seal member is not particularly limited and may be appropriately selected depending on the intended purpose. However, the thickness thereof is preferably 0.5 μm or more but 100 μm or less.

<Other Members>

The other members are not particularly limited and may be appropriately selected depending on the intended purpose.

[Use of Laminated Structure]

Use of the laminated structure of the present disclosure is not particularly limited and may be appropriately selected depending on the intended purpose. For example, the laminated structure of the present disclosure may be used as a finished product or may be used as a component of, for example, another electronic equipment.

For example, the laminated structure of the present disclosure can be suitably used in a light-adjusting device (electrochromic light-adjusting device) that utilizes electrochromic phenomenon. Examples of the light-adjusting device include, but are not limited to, light-adjusting spectacles, glare proof mirrors, and light-adjusting glasses. Therefore, the laminated structure of the present disclosure preferably has transparency.

(Multiple Laminated Structure)

A multiple laminated structure of the present disclosure includes two laminated structures each of which is the laminated structure of the present disclosure. The electrically conductive layers in the two laminated structures face each other via a layer to be sealed. The multiple laminated structure includes a seal member including the first resin and the inorganic particles, and the seal member is between the two laminated structures, is at a side portion of the two laminated structures, or is between the two laminated structures and at a side portion of the two laminated structures. The multiple laminated structure further includes other members if necessary.

The laminated structure is the same as the laminated structure of the present disclosure. Therefore, the description thereof is omitted herein.

The layer to be sealed means a layer positioned between the two laminated structures when the electrically conductive layers in the two laminated structures are disposed so as to face each other. That is, examples of the layer to be sealed include an adhesive layer, an electronic material layer, an electrically conductive layer, and an underlying layer.

(Lens)

As described above, the laminated structure of the present disclosure can be suitably used as lenses used in, for example, spectacles and cameras. Particularly, the laminated structure, which includes the electrochromic layer as the electronic material layer and the resin layer that is an optical lens, is preferably used as a lens of light-adjusting spectacles or a lens of light-adjusting camera.

(Method for Producing Laminated Structure)

A method for producing a laminated structure of the present disclosure includes: disposing, in a mold, an electrically conductive substrate including: an electrically conductive layer; an underlying layer including a first resin and inorganic particles; and a support including a second resin, the electrically conductive layer, the underlying layer, and the support being disposed in this order, so that the electrically conductive layer comes into contact with the mold, and injecting, onto the support exposed, a third resin that is at least one selected from the group consisting of a resin of same kind as the second resin and a resin having a softening temperature equal to or lower than a softening temperature of the second resin, to integrally form a resin layer; and further includes other steps if necessary.

The method for producing the laminated structure of the present disclosure can be suitably performed by, for example, an apparatus for producing the laminated structure (insert injection molding apparatus) that will be described hereinafter. Details of the method for producing the laminated structure of the present disclosure will be described hereinafter.

In the method for producing the laminated structure of the present disclosure, a temperature of the mold is preferably equal to or lower than a softening temperature of the second resin. This makes it possible to prevent the support from being softened to thereby prevent damage to the electrically conductive layer.

The method for producing the laminated structure of the present disclosure, the injecting is preferably injecting, onto the support exposed, the third resin having a softening temperature equal to or lower than the softening temperature of the second resin from a direction that is substantially parallel to a surface of the support, to integrally form the resin layer. This makes it possible to improve profile irregularity of a molded body, to improve fluidity and a filling rate of the resin discharged, and to prevent damage to the insert sheet including the electrically conductive layer, the underlying layer, and the support due to shearing stress of the resin injected.

Moreover, in the method for producing the laminated structure of the present disclosure, a melt volume-flow rate of the third resin is preferably 14 $cm^3$/10 min or more, the melt volume-flow rate being determined according to ISO 1133. In injection molding, as fluidity of the third resin injected is higher, damage to the insert sheet (particularly, electrically conductive layer) due to shearing stress can be decreased. Therefore, when the melt volume-flow rate of the third resin is 14 $cm^3$/10 min or more, damage such as occurrence of cracks in the electrically conductive layer can be further prevented.

Particularly, when a thickness of the resin layer is small, the insert sheet is easily influenced by shearing stress due to injected resin. Therefore, for example, when an average thickness of the resin layer is 2 mm or less, the melt volume-flow rate is more preferably 24 $cm^3$/10 min or more.

Hereinafter, embodiments of the present disclosure will be described. However, the present disclosure should not be construed as being limited to these embodiments.

Note that, the number, position, and shape of the following constituent members are not limited to the embodiments of the present disclosure, and can be the number, position, and shape that are preferable for performing the present disclosure.

First Embodiment

Figure 1B:
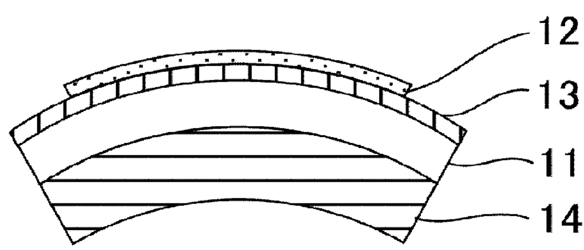
FIG. 1B is a schematic side view presenting another example of the electrically conductive transparent substrate according to the first embodiment.
Figure 1C:
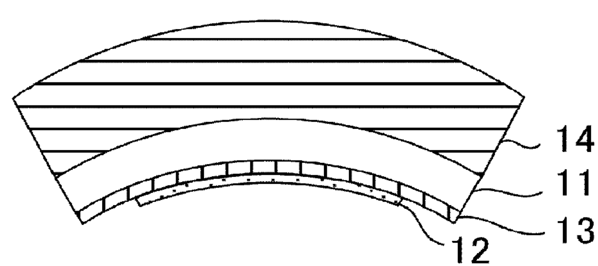
FIG. 1C is a schematic side view presenting another example of the electrically conductive transparent substrate according to the first embodiment.

First, the laminated structure according to the first embodiment will be described. The laminated structure according to the first embodiment is an embodiment relating to an electrically conductive transparent substrate. FIGS. 1A to 1C are each a schematic side view presenting one example of an electrically conductive transparent substrate according to the first embodiment. FIG. 1A presents one example of an electrically conductive transparent substrate having a plane shape. FIG. 1B presents one example of an electrically conductive transparent substrate having a convex shape. FIG. 1C presents one example of an electrically conductive transparent substrate having a concave shape.

An electrically conductive transparent substrate 10 according to the first embodiment includes: a resin substrate (support) 11 of a thermoplastic resin as a support; and an underlying layer 13 and an electrically conductive layer 12 on the resin substrate 11 as presented in FIG. 1A to 1C. On the back of the resin substrate 11, a resin layer 14 that is integrated through welding or adhesion is formed. In the present embodiment, the underlying layer 13 includes a first resin and inorganic particles, and the resin layer 14 includes a third resin that is at least one selected from the group consisting of the resin of the same kind as the second resin included in the support and the resin having a softening temperature equal to or lower than a softening temperature of the second resin.

The electrically conductive transparent substrate 10 according to the first embodiment is prepared by forming the underlying layer 13 and the electrically conductive layer 12 on the resin substrate 11 and then integrally forming the resin layer 14 and the back of the resin substrate 11 through welding processing or adhesion processing.

A method for performing the insert molding through welding processing or adhesion processing is as follows. Specifically, a laminated sheet in which the underlying layer 13 and the electrically conductive layer 12 are formed on the resin substrate 11 as an insert sheet is set on a molding mold. Then, the resin of which the resin layer 14 is formed is injected or cast to the back of the insert sheet (side of the resin substrate 11), and is cured to be integrally molded.

An electrically conductive transparent substrate 10 having a 3D (three-dimensional) curved shape, which is presented in FIG. 1B and FIG. 1C, can be produced by adjusting a shape of a mold used in the insert molding. The method of this processing will be described hereinafter.

Here, the electrically conductive layer 12 is formed on the whole or a part of the resin substrate 11. In FIG. 1B and FIG. 1C, the whole of the electrically conductive transparent substrate 10 is processed so as to have a curved shape. However, only a part of the electrically conductive transparent substrate 10 may be processed so as to have a curved shape.

According to the first embodiment, the underlying layer 13 includes the first resin and the inorganic particles, and the resin layer 14 includes the third resin that is at least one selected from the group consisting of the resin of the same kind as the second resin included in the support and the resin having a softening temperature equal to or lower than a softening temperature of the second resin. As a result, deformation of a surface on which the electrically conductive layer 12 is formed at the time of heat processing can be suppressed, and thus occurrence of cracks in the electrically conductive layer 12 can be suppressed.

Second Embodiment

Figure 2A:
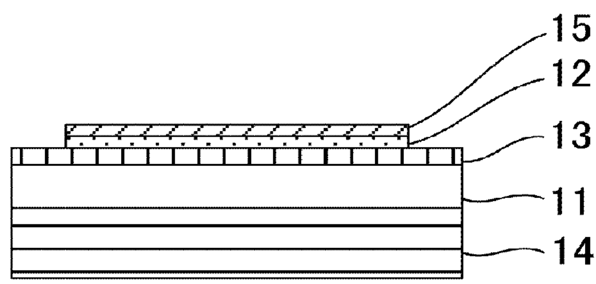
FIG. 2A is a schematic side view presenting one example of an electronic device substrate according to the second embodiment.
Figure 2B:
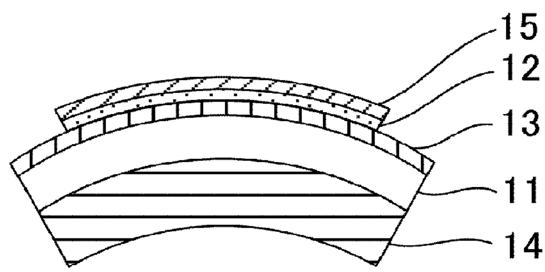
FIG. 2B is a schematic side view presenting another example of the electronic device substrate according to the second embodiment.
Figure 2C:
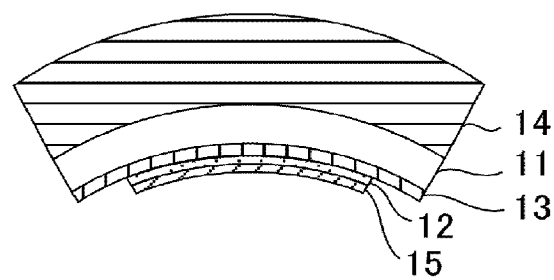
FIG. 2C is a schematic side view presenting another example of the electronic device substrate according to the second embodiment.

A laminated structure according to the second embodiment will be described hereinafter. The laminated structure according to the second embodiment relates to an electronic device substrate. FIG. 2A to FIG. 2C are each a schematic side view presenting one example of an electronic device substrate according to the second embodiment. FIG. 2A presents one example of an electronic device substrate having a plane shape. FIG. 2B presents one example of an electronic device substrate having a convex shape. FIG. 2C presents one example of an electronic device substrate having a concave shape.

An electronic device substrate 20 according to the second embodiment includes an electronic material layer 15 on an electrically conductive layer 12. The other members (layers) are the same as the electrically conductive transparent substrate 10.

The electronic device substrate 20 according to the second embodiment can be produced by forming an underlying layer 13, an electrically conductive layer 12, and an electronic material layer 15 on a resin substrate 11, and then integrally forming a resin layer 14 and the back of the resin substrate 11 through welding processing or adhesion processing.

A method for performing the insert molding as welding processing or adhesion processing is as follows. Specifically, a laminated sheet in which the underlying layer 13, the electrically conductive layer 12, and the electronic material layer are formed on the resin substrate 11 as an insert sheet is set on a molding mold. Then, a resin of which the resin layer 14 is formed is injected or cast to the back of the insert sheet (side of the resin substrate 11) and is cured to be integrally molded.

An electronic device substrate 20 having a 3D curved shape, which is presented in FIG. 2B and FIG. 2C, can be produced by adjusting a shape of a mold used in the insert molding. The method of this processing will be described hereinafter.

According to the second embodiment, the underlying layer 13 includes the first resin and the inorganic particles, and the resin layer 14 includes the third resin that is at least one selected from the group consisting of the resin of the same kind as the second resin included in the support and the resin having a softening temperature equal to or lower than a softening temperature of the second resin. As a result, deformation of a surface on which the electrically conductive layer 12 is formed at the time of heat processing can be suppressed, and thus occurrence of cracks in the electrically conductive layer 12 can be suppressed.

Third Embodiment

Figure 3:
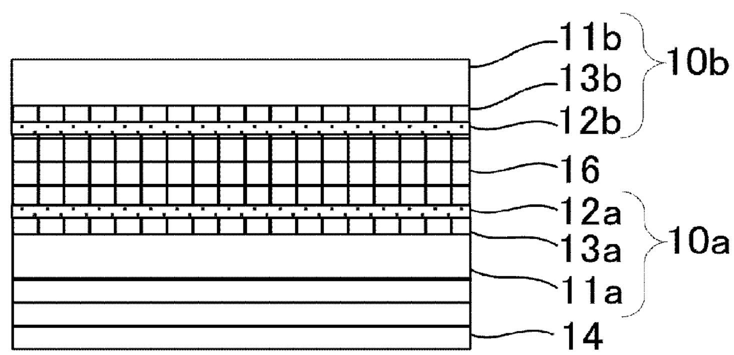
FIG. 3 is a schematic side view presenting one example of an electrically conductive substrate according to the third embodiment.

Next, a laminate according to the third embodiment will be described. The laminated structure according to the third embodiment relates to an electrically conductive substrate. FIG. 3 is a schematic side view presenting one example of an electrically conductive substrate according to the third embodiment. FIG. 3 presents one example of an electrically conductive substrate having a plane shape. Electrically conductive substrates having a convex shape and a concave shape are not illustrated, but can be electrically conductive substrates having the same curved surface shape as those presented in FIG. 1B and FIG. 1C.

An electrically conductive substrate 30 according to the third embodiment includes an electrically conductive transparent substrate 10*a* and an electrically conductive transparent substrate 10*b* that have the same configuration as the electrically conductive transparent substrate 10. The electrically conductive transparent substrate 10*a* includes a resin substrate 11*a*, an underlying layer 13*a*, and an electrically conductive layer 12*a*, and the electrically conductive substrate 10*b* includes a resin substrate 11*b*, an underlying layer 13*b*, and an electrically conductive layer 12*b*.

The electrically conductive substrate 30 includes a double-sided adhesion layer 16 as an adhesive layer that binds the electrically conductive layer 12*a* and the electrically conductive layer 12*b*. That is, the electrically conductive substrate 30 has a configuration where the electrically conductive substrate 10*a* and the electrically conductive substrate 10*b* are pasted with each other via the double-sided adhesion layer 16. The resin substrates 11*a* and 11*b*, the electrically conductive layers 12*a* and 12*b*, and the underlying layers 13*a* and 13*b* can include the same as the resin substrate 11, the electrically conductive layer 12, and the underlying layer 13, respectively. The double-sided adhesion layer 16 may be OCA tape.

Figure 5:
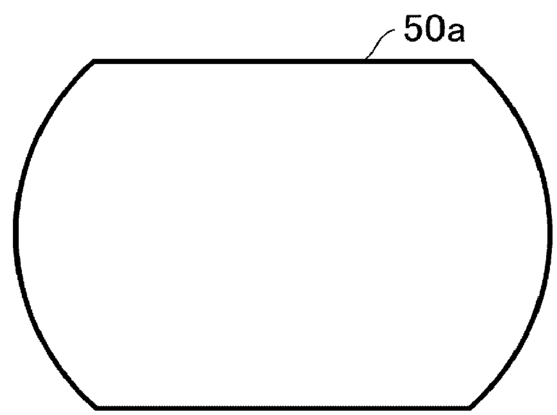
FIG. 5 is a schematic top view presenting one example of a resin substrate as a support in the electrically conductive substrate according to the third embodiment.

FIG. 5 is a schematic top view presenting one example of a resin substrate as a support in the electrically conductive substrate according to the third embodiment. As presented in FIG. 5, an outline 50*a* of the resin substrate 11*a* is formed of liner portions including two straight lines that are substantially parallel to each other and curved line portions including two arc-shaped curved lines that connect both ends of the liner portions. In the example presented in FIG. 5, the underlying layer 13*a*, the electrically conductive layer 12*a*, the double-sided adhesion layer 16, the electrically conductive layer 12*b*, the underlying layer 13*b*, and the resin substrate 11*b* have the same outline as presented in FIG. 5.

An electrically conductive substrate 30 having a flat plate shape presented in FIG. 3 is produced by pasting the electrically conductive transparent substrate 10*a* and the electrically conductive transparent substrate 10*b* with each other using, for example, the double-sided adhesion layer 16, and then integrally forming the resin layer 14 and the back of the resin substrate 11 (side of the resin substrate 11*a*) through welding processing.

A method for performing the insert molding through welding processing or adhesion processing is as follows. Specifically, a laminated sheet in which the electrically conductive transparent substrate 10*a* and the electrically conductive transparent substrate 10*b* are pasted with each other as an insert sheet is set on a molding mold. Then, a material of the resin of which the resin layer 14 is formed is injected or cast to the back of the insert sheet (side of the resin substrate 11*a*) and is cured to be integrally molded.

Furthermore, by forming an electronic material layer at a part of the region between two electrically conductive layers, a laminate of an electronic device can be produced.

Fourth Embodiment

Figure 4:
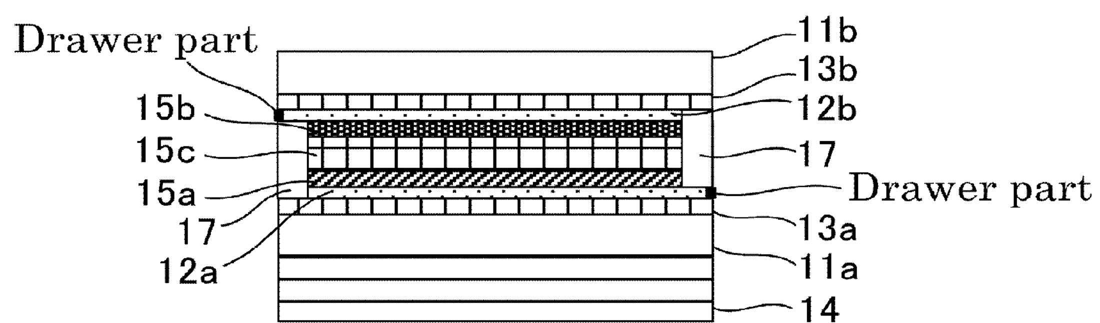
FIG. 4 is a schematic side view presenting one example of an electronic device substrate according to the fourth embodiment.

Next, a laminated structure according to the fourth embodiment will be described. The laminated structure according to the fourth embodiment relates to an electronic device substrate. FIG. 4 is a schematic side view presenting one example of an electronic device substrate according to the fourth embodiment. FIG. 4 presents one example of an electronic device substrate having a plane shape. Electronic device substrates having a convex shape and a concave shape are not illustrated, but can be electronic device substrates having the same curved surface shape as those presented in FIG. 2B and FIG. 2C.

The electronic device substrate 40 according to the fourth embodiment includes an electronic device substrate 20*a* and an electronic device substrate 20*b* that have the same configuration as the electronic device substrate 20. The electronic device substrate 20*a* has a resin substrate 11*a*, an underlying layer 13*a*, an electrically conductive layer 12*a*, and an electronic material layer 15*a*, and an electronic device substrate 20*b* has a resin substrate 11*b*, an underlying layer 13*b*, an electrically conductive layer 12*b*, and an electronic material layer 15*b*.

Furthermore, the electronic device substrate 40 includes an electronic material layer 15*c* sandwiched between the electronic material layer 15*a* and the electronic material layer 15*b*. That is, the electronic device substrate 40 has a configuration where the electronic material layer 15*c* is sandwiched between the electronic device substrate 20*a* and the electronic device substrate 20*b*. The resin substrates 11*a* and 11*b*, the electrically conductive layers 12*a* and 12*b*, and the underlying layers 13*a* and 13*b* can include the same as the resin substrate 11, the electrically conductive layer 12, and the underlying layer 13, respectively.

In the present embodiment, the electronic material layer 15 includes an oxidation electrochromic (EC) part as the electronic material layer 15*a*, a reduction EC part as the electronic material layer 15*b*, and a solid electrolyte portion as the electronic material layer 15*c*.

In addition, the electronic device substrate 40 includes a seal member 17 that covers and protects the electrically conductive layer 12*a*, the electronic material layer 15*a*, the electronic material layer 15*c*, the electronic material layer 15*b*, and the electrically conductive layer 12*b* from sides. As a drawer part, a part of the electrically conductive layer 12*a* and a part of the electrically conductive layer 12*b* protrude from the seal member 17.

Figure 6A:
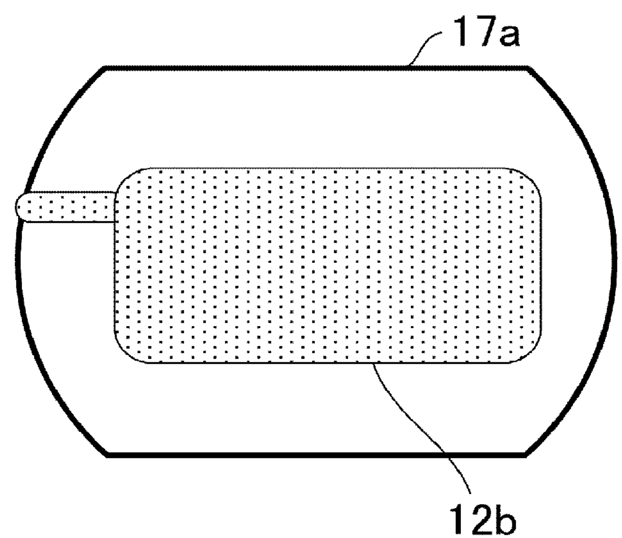
FIG. 6A is a schematic top view presenting one example of the electronic device substrate according to the fourth embodiment.
Figure 6B:
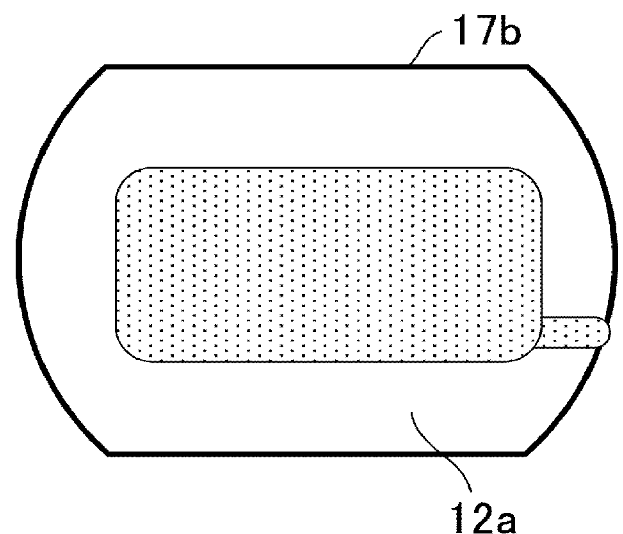
FIG. 6B is a schematic top view presenting one example of the electronic device substrate according to the fourth embodiment.
Figure 6C:
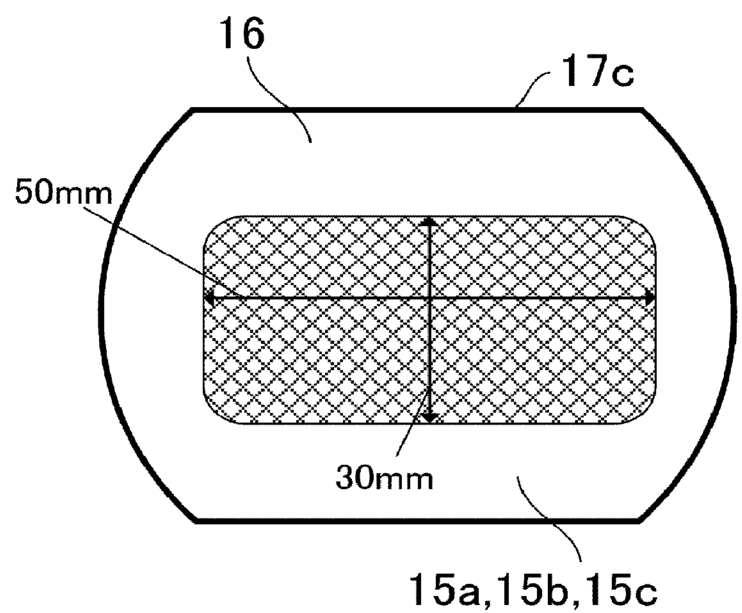
FIG. 6C is a schematic top view presenting one example of the electronic device substrate according to the fourth embodiment.

FIG. 6A and FIG. 6C are each a schematic top view presenting one example of an electronic device substrate according to the fourth embodiment. FIG. 6A presents one example of a positional relationship between the seal member 17*a* and the electrically conductive layer 12*b*. FIG. 6B presents one example of a positional relationship between the seal member 17*b* and the electrically conductive layer 12*a*. FIG. 6C presents one example of a positional relationship between the seal member 17*c* and the electronic material layers 15*a*, 15*b*, and 15*c*. Note that, each of the arrows in FIG. 6C presents one example of the dimension (mm) of the electronic material layer.

The electronic device substrate 40 having a flat plate shape presented in FIG. 4 is produced in the following manner. For example, the electronic device substrate 20*a* and the electronic device substrate 20*b* are pasted with the electronic material layer 15*c* being sandwiched therebetween. Then, the seal member 17 is formed and the resin layer 14 and the back of the resin substrate 11*a* are integrally formed through welding processing or adhesion processing to thereby form the electronic device substrate 40. Note that, the seal member 17 can be formed as a layer for pasting at the time of the pasting.

A method for performing the insert molding through welding processing or adhesion processing is as follows. The electronic device substrate 20*a* and the electronic device substrate 20*b* are pasted with the electronic material layer 15*c* being sandwiched therebetween, and then a seal member is formed to thereby prepare a laminated sheet. The laminated sheet as an insert sheet is set on a molding mold and a material of the resin of which the resin layer 14 is formed is injected or cast to the back of the insert sheet (side of the resin substrate 11*a*) and is cured to be integrally molded.

Note that, in such application that color development and a color change of the electronic material layers 15*a* and 15*c* are visually recognized from only one direction of the resin substrate 11*a* or 11*b*, one resin substrate to be visually recognized is transparent, but the other resin substrate may not be transparent.

<Embodiment in Method for Producing Laminated Structure>

In the case of the insert molding is performed as welding processing, preforming (preparatory molding) of the insert sheet is performed for the purpose of improving processing accuracy, preventing damage to a sheet, and improving a yield rate in the processing. Here, a method for forming a curved surface through preforming suitable for the present disclosure will be described.

Figure 7:
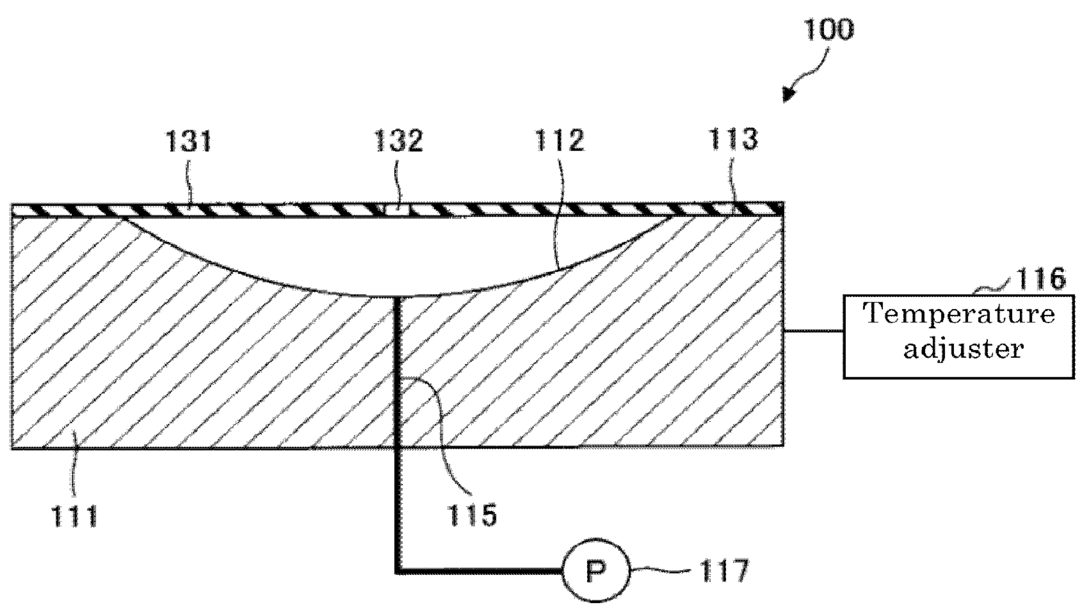
FIG. 7 is a schematic side diagram presenting one example of a curved surface forming apparatus according to one embodiment of the present disclosure.
Figure 8A:
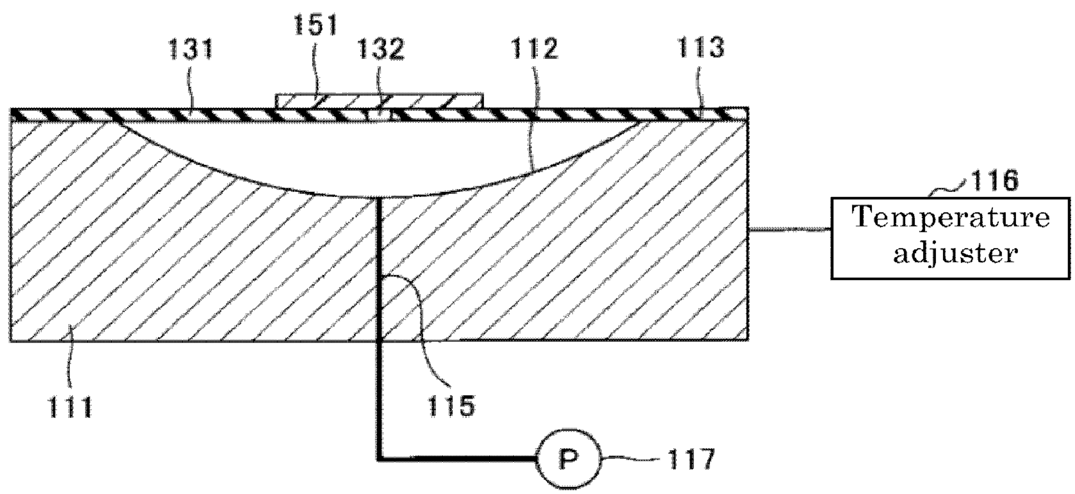
FIG. 8A is a diagram presenting one example of a method for forming a three-dimensional curved surface using a curved surface forming apparatus according to one embodiment of the present disclosure in the order of steps.
Figure 8B:
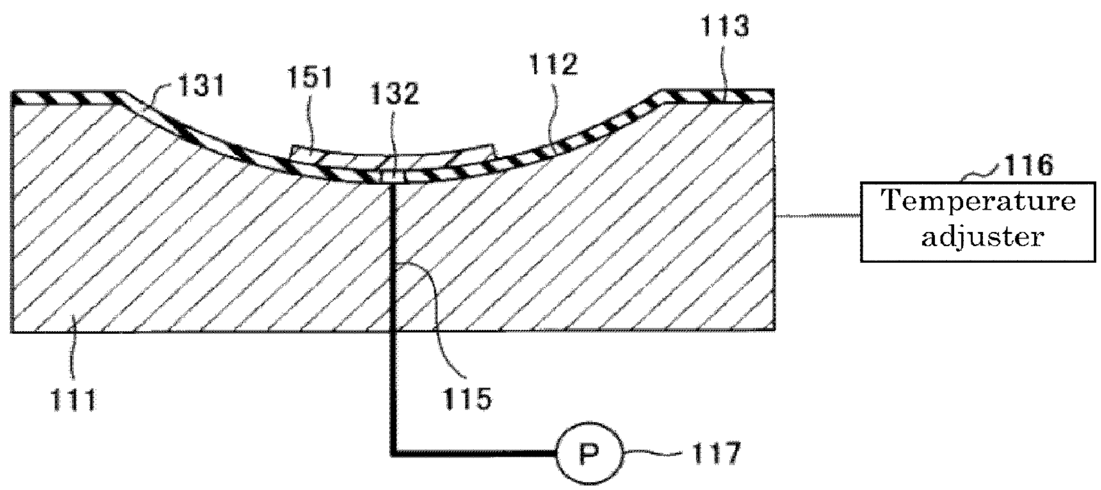
FIG. 8B is a diagram presenting one example of a method for forming a three-dimensional curved surface using a curved surface forming apparatus according to one embodiment of the present disclosure in the order of steps.

FIG. 7 is a schematic side diagram presenting one example of a curved surface forming apparatus according to one embodiment of the present disclosure. FIG. 8A and FIG. 8B are each a diagram presenting one example of a method for forming a three-dimensional curved surface using a curved surface forming apparatus according to one embodiment of the present disclosure in the order of steps.

As presented in FIG. 7, a curved surface forming apparatus 100 includes a concave mold 111 and a temperature adjuster 116 configured to adjust a temperature of the concave mold 111. A hole 115, which connects the back with the bottom of a concave surface 112 having a three-dimensional (3D) curved shape (e.g., a spherical shape), is formed in the concave mold 111, and an intake and exhaust pump 117 is connected to the hole 115. The curved surface forming apparatus 100 includes an elastic sheet 131 provided on a plane 113 around the concave surface 112 of the concave mold 111 so as to cover the concave surface 112. The elastic sheet 131 is provided with a hole 132 penetrating through both sides thereof.

When the curved surface forming apparatus 100 is used to process a laminated sheet as an insert sheet so as to have a 3D curved shape, an insert sheet 151 is provided as presented in FIG. 8A. Then, the concave mold 111 is heated to around a softening temperature (Tg) of the resin substrate of the insert sheet and a temperature thereof is adjusted using the temperature adjuster 116. Then, the insert sheet 151 is disposed on the elastic sheet 131 so as to cover the hole 132. For example, a temperature in the adjustment of the temperature is lower than the softening temperature (Tg).

Next, the intake and exhaust pump 117 is operated, and then an air in the space between the concave surface 112 and the elastic sheet 131 is discharged. As a result, the elastic sheet 131 adheres to the concave surface 112 while the elastic sheet 131 is expanded. In addition, the insert sheet 151 adheres to the elastic sheet 131 and approaches the concave mold 111 correspondingly to deformation of the elastic sheet 131. Therefore, heat is transmitted from the concave mold 111 to the insert sheet 151, and the resin substrate included in the insert sheet 151 is softened. As presented in FIG. 8B, the insert sheet 151 adheres to the concave mold 111, and the insert sheet 151 is plastically deformed so as to contour the concave surface 112.

Then, the elastic sheet 131 returns to the original state and the insert sheet 151 can be separated from the concave mold 111 by stopping the operation of the intake and exhaust pump 117 and opening the hole 115 to an atmosphere. Because the resin substrate is plastically deformed, the insert sheet 151 permanently maintains its shape followed along the concave surface 112 even when the insert sheet 151 is separated from the concave mold 111.

As described above, the insert sheet 151 can be processed so as to have a 3D curved shape.

In this processing method, because the elastic sheet 131 is expanded and contracted in an isotropic manner during processing, the insert sheet 151 uniformly applies pressure to the concave mold 111 and adheres thereto. Moreover, the resin substrate included in the insert sheet 151 adheres to the concave mold 111 that has undergone a temperature adjustment and is gradually softened with heat, without being heated and softened in advance.

Therefore, according to the present processing method, it is possible to deform the electrically conductive layer included in the insert sheet 151 while cracks and distortion in a direction along the curved surface are prevented and to also prevent distortion and cracks of a functional layer when the functional layer on the electrically conductive layer is included. Even in the cases where mechanical characteristics are ununiform in the electrically conductive layer (e.g., the case where the electrically conductive layer is divided or the case where a plurality of TFTs are arranged in the form of a matrix), variation in distortion of the functional layer can be prevented and uniform performance can be obtained.

Figure 9:
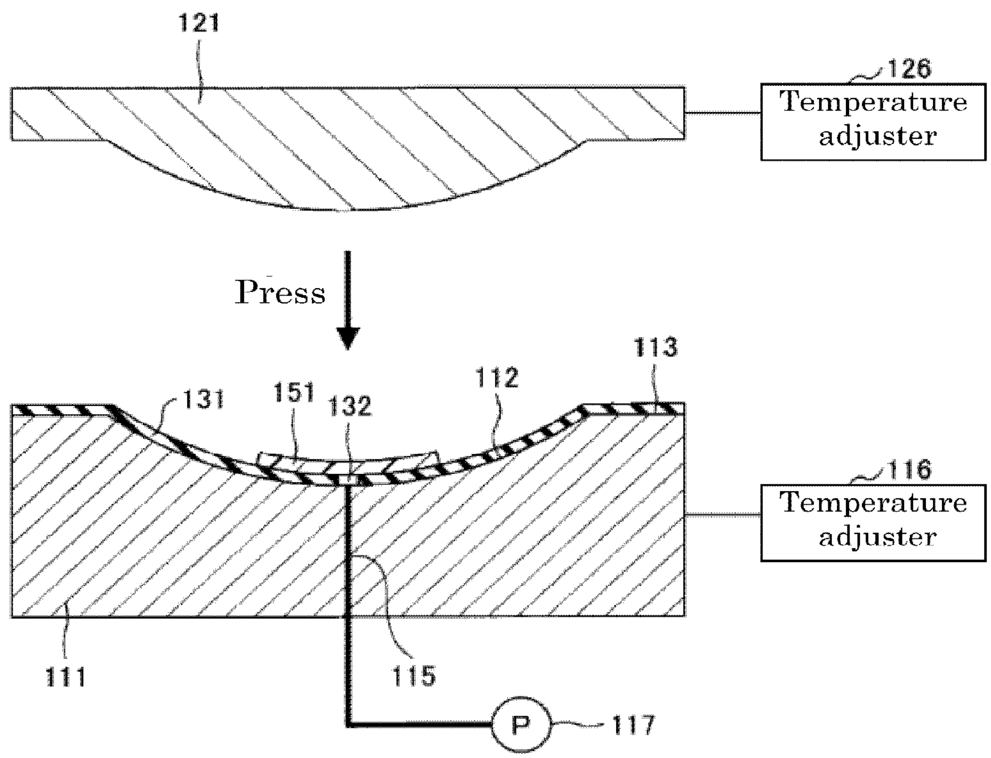
FIG. 9 is a diagram presenting another example of a method for forming a three-dimensional curved surface using a curved surface forming apparatus according to one embodiment of the present disclosure in the order of steps.

FIG. 9 is a diagram presenting another example of a method for forming a three-dimensional curved surface using a curved surface forming apparatus according to one embodiment of the present disclosure in the order of steps.

As presented in FIG. 9, the curved surface forming apparatus 100 may include a convex mold 121 that fits into the concave mold 111 and a temperature adjuster 126 configured to adjust a temperature of the convex mold 121. When the curved surface forming apparatus 100 is used, it is possible to improve profile irregularity of the curved surface by allowing the insert sheet (laminated sheet) 151 to adhere to the concave mold 111 and then pressing the insert sheet 151 using the convex mold 121 that has undergone a temperature adjustment by the temperature adjuster 126.

In the processing method, an area of the concave surface of the concave mold is preferably larger than that of a laminated sheet to be processed in a plan view. In this case, it is possible to allow the whole of the laminated sheet to adhere to the concave surface without immobilizing the laminated sheet and to process the laminated sheet so as to have a 3D curved surface while distortion is further prevented.

For example, temperatures of the concave mold and the convex mold are preferably adjusted to a temperature that is lower than a softening temperature (Tg) of the resin substrate, and a temperature of the laminated sheet having a flat plate shape before adherence to the concave mold is preferably adjusted to a temperature that is lower than room temperature or the softening temperature by 20° C. or more.

Here, members included in the curved surface forming apparatus 100 will be described in more detail.

[Elastic Sheet 131]

The elastic sheet 131 is expanded and contracted under reduced pressure or by application of pressure, and has a function of allowing the laminated sheet to adhere to a mold. Moreover, the elastic sheet 131 also has a function of transmitting heat of the mold to the laminated sheet.

A material of the elastic sheet is not particularly limited and may be appropriately selected depending on the intended purpose. For example, known elastic rubber materials can be used. Examples of the elastic rubber materials include, but are not limited to, natural rubber, styrene-butadiene rubber (SBR), isoprene rubber (IR), butadiene rubber (BR), chloroprene rubber (CR), acrylonitrile•butadiene rubber (NBR), butyl rubber (isobutylene•isoprene rubber (IIR)), ethylene•propylene rubber (EPM), ethylene•propylene•diene rubber (EPDM), urethane rubber (U), silicone rubber (silicone rubber (Si, Q)), and fluorine rubber (FKM).

Particularly, a material of the elastic sheet is preferably silicone rubber and fluorine rubber.

In addition, as the material of the elastic sheet, it is possible to use for example, thermoplastic elastomers such as styrene-based thermoplastic elastomers, olefin-based thermoplastic elastomers, ester-based thermoplastic elastomers, urethane-based thermoplastic elastomers, amide-based thermoplastic elastomers, polyvinyl chloride (PVC)-based thermoplastic elastomers, and fluorine-based thermoplastic elastomers. The material of the elastic sheet is preferably selected depending on a condition such as a temperature or pressure when a curved surface is formed on the laminated sheet. For example, a material is preferably selected by considering, for example, heat resistance and elasticity depending on a condition.

An average thickness of the elastic sheet is not particularly limited and may be appropriately selected depending on the intended purpose. The average thickness thereof is preferably 0.01 mm or more but 2.0 mm or less because a curved surface is easily formed.

Note that, when the elastic sheet has stickiness, the insert sheet can be held without forming a hole.

Preferably, the elastic sheet hardly adheres to a laminated sheet and a mold, and a surface of the elastic sheet that is in contact with the laminated sheet or the mold preferably has a slippery property in terms of uniformity of deformation of the insert sheet. In addition, after formation of the curved surface, a surface of the elastic sheet is preferably subjected to surface finishing for decreasing friction in order to exfoliate the elastic sheet from the mold and to remove the insert sheet from the elastic sheet.

A hole 132 of the elastic sheet 131 is provided in order to attract and hold the insert sheet 151 to the elastic sheet 131. The number of the holes 132 may be one, or may be two or more. The position of the hole 132 can be optionally set depending on a shape of the insert sheet 151.

[Molds 111 and 121]

The concave mold and the convex mold may be generally used molds so long as they have a heat capacity suitable for processing and have a shape of a 3D curved surface formed on the laminated sheet such as a curved surface along a spherical shape.

Examples of a material of the mold include, but are not limited to, metallic materials such as aluminum (Al) and nickel (Ni), glass, and ceramics.

The temperature adjuster includes a temperature adjusting heater attached to the inside or the outside of the mold. A surface of the mold may be subjected to a general heat resistance treatment, a general release treatment, or both thereof.

The number and the position of the hole 115 of the concave mold 111 can be optionally set depending on a shape of the insert sheet 151.

Subsequently, a method of the insert molding as one example of the method for producing the laminated structure of the present disclosure will be described.

In the present disclosure, the insert sheet 151 is disposed on one surface of a mold capable of being opened and closed. Then, the mold is closed, a melted resin is injected and filled to the back of the resin substrate. The resin is cooled and solidified to thereby form a welded resin part (resin layer).

According to the present disclosure, an injection molding machine such as an electric injection molding machine, a hydraulic injection molding machine, or a hybrid hydraulic injection molding machine can be used.

Figure 10:
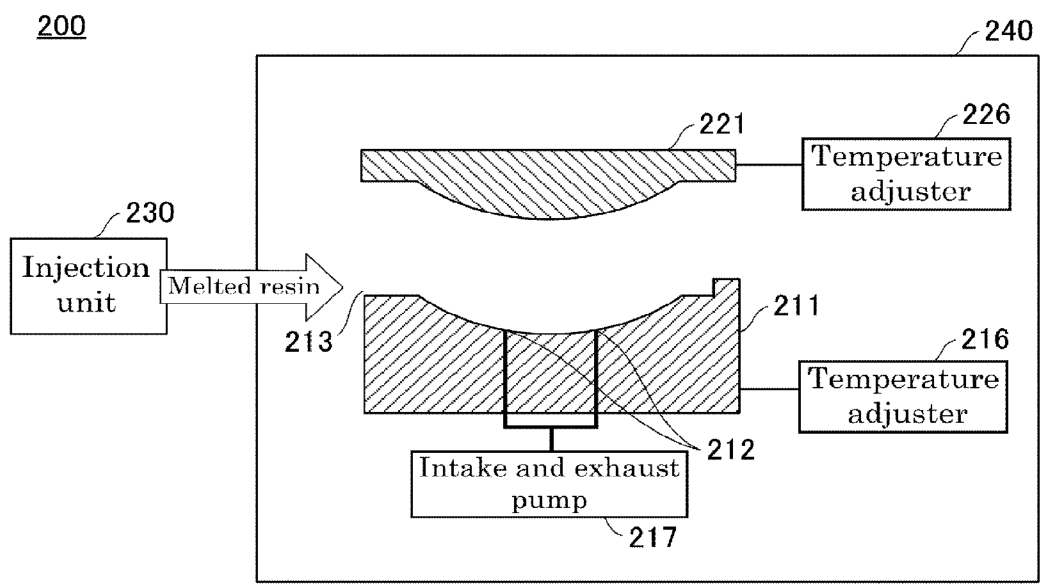
FIG. 10 is an explanatory diagram presenting one embodiment of an insert injection molding apparatus for preparing a molded body of a spherical surface that is one example of the laminated structure of the present disclosure.
Figure 11A:
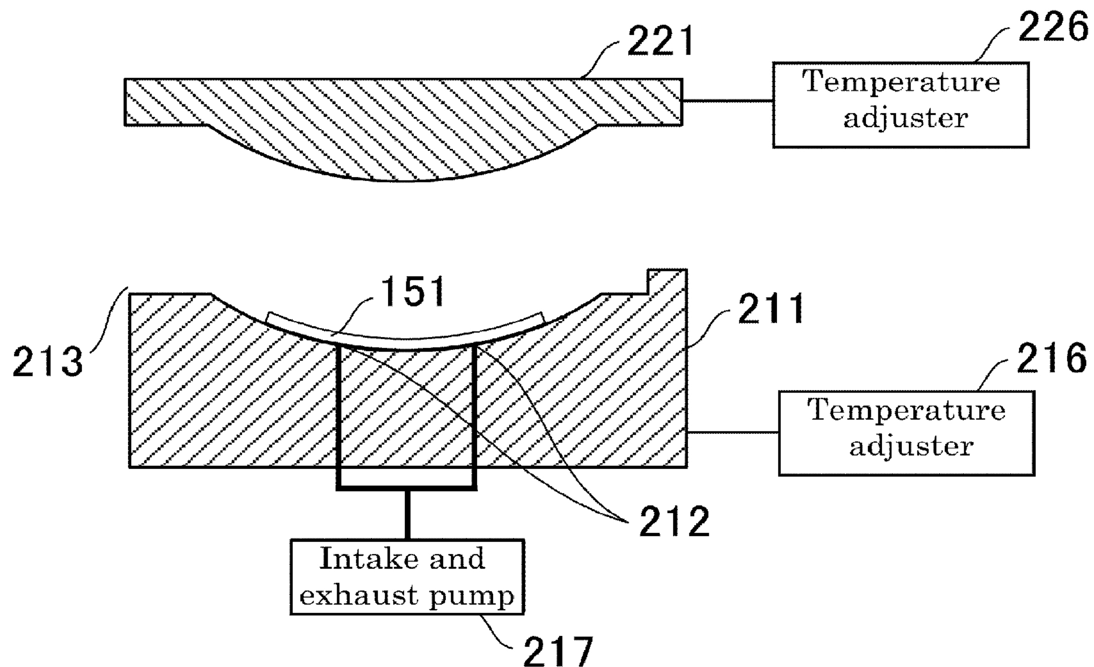
FIG. 11A is a diagram presenting one example of a method for integrally molding an insert sheet using an insert injection molding apparatus in the order of steps.
Figure 11B:
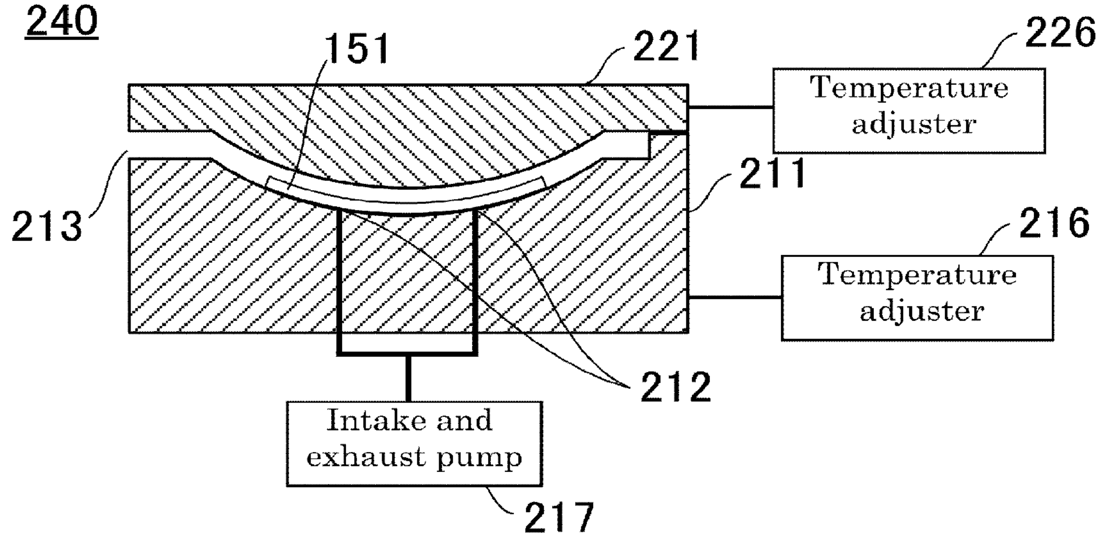
FIG. 11B is a diagram presenting one example of a method for integrally molding an insert sheet using an insert injection molding apparatus in the order of steps.
Figure 11C:
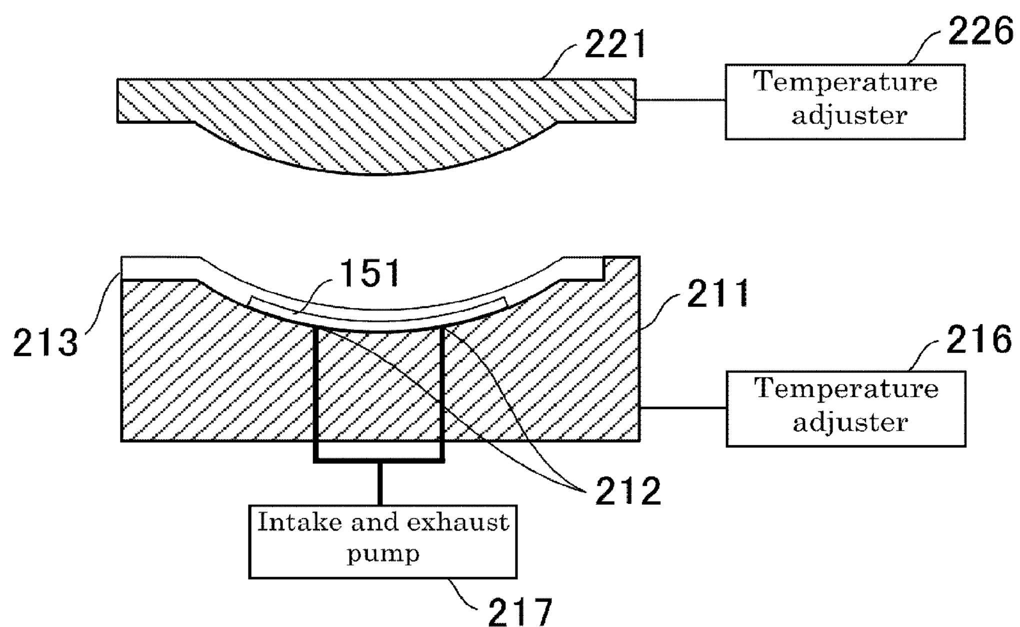
FIG. 11C is a diagram presenting one example of a method for integrally molding an insert sheet using an insert injection molding apparatus in the order of steps.

FIG. 10 is an explanatory diagram presenting one embodiment of an insert injection molding apparatus for preparing a molded body of a spherical surface that is one example of the laminated structure of the present disclosure. FIGS. 11A to 11C are each a diagram presenting a method for integrally molding an insert sheet using an insert injection molding apparatus in the order of steps.

As presented in FIG. 10, an insert injection molding apparatus 200 includes an injection unit 230 and a mold closing unit 240. In the insert injection molding apparatus 200, a resin material, which is heated and melted using an the injection unit 230, is injected to a mold of the mold closing unit 240 using, for example, a jetting nozzle, and molds are opened and closed to thereby prepare a resin molded body (laminated structure).

The mold closing unit 240 includes a movable mold 221 and a fixed mold 211, and a temperature of the movable mold 221 and a temperature of the fixed mold 211 are controlled by a temperature adjuster 226 and a temperature adjuster 216, respectively.

Because the insert sheet 151 is disposed on one mold according to the necessity, a sheet attracting hole 212 and a step for determining position are provided. The sheet attracting hole 212 is connected to an intake and exhaust pump 217. When the insert sheet 151 is fixed, the sheet attracting hole 212 attracts the insert sheet 151. When the insert sheet 151 is removed, gas such as air is jetted. The sheet attracting hole 212 and the step for determining position are formed in order to improve accuracy of position of the insert sheet. Therefore, the sheet attracting hole 212 and the step for determining position are not necessary when high accuracy of position is not required.

When the insert injection molding apparatus 200 is used to integrally mold and process the insert sheet 151 together with the resin of which the resin layer is formed (welding resin), the insert sheet 151 is provided as presented in FIG. 11A. A heating condition is controlled by warming and adjusting the molds to a temperature that is equal to or lower than a softening temperature (Tg) of the welding resin using the temperature adjusters 216 and 226.

Then, the insert sheet 151 is set on the mold 211 so as to cover the attracting hole 212, and the insert sheet 151 is fixed by discharging gas using the intake and exhaust pump 217. Note that, fixation of the insert sheet 151 through attraction may be performed before the welding resin is injected.

As described above, the insert sheet 151 is preferably subjected to preforming. However, when fixation of the insert sheet is sufficient, the preforming may not be performed. The insert sheet 151 is set on the fixed mold, but may be set on the movable mold 221 by changing a structure of the mold.

Next, as presented in FIG. 11B, the movable mold 211 is moved to close the molds, and the welding resin melted is injected to a resin injecting part 213 from the injection unit 230 to thereby fill the resin.

Figures 12, 13:
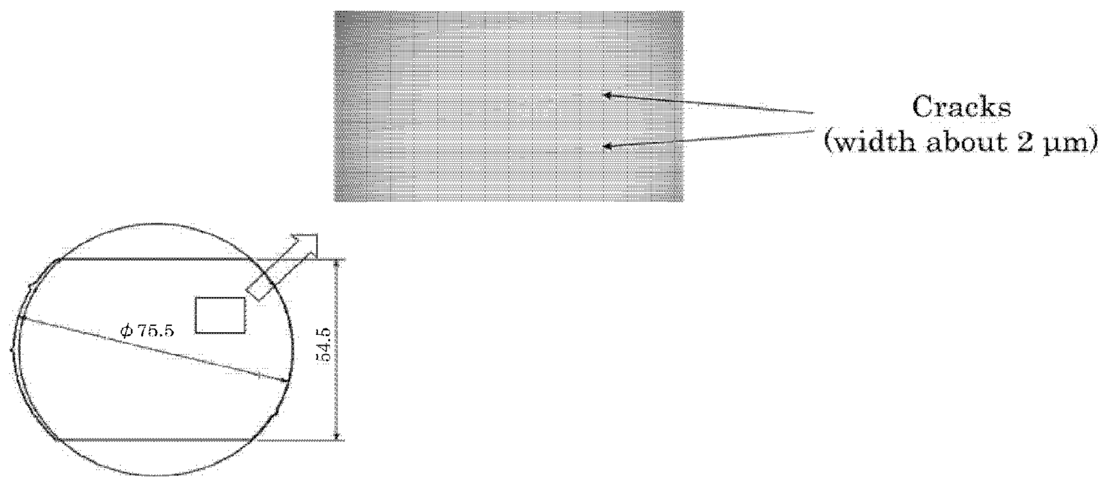
FIG. 12 is a schematic side view presenting one example of a shape of the laminated structure of the present disclosure using the insert injection molding apparatus.
FIG. 13 is a photomicrograph in which cracks generated in the laminated structure in Comparative Example 1 are photographed, and presents the photographed position.

As presented in FIG. 11C, after the resin is cooled and solidified, the movable mold 221 is moved to open the molds, an integrated laminated body (laminated structure) as presented in FIG. 12 is extracted.

As described above, a laminated structure obtained by integrally molding the insert sheet 151 and the resin layer (welding resin) can be prepared.

The movable mold 221 and the fixed mold 212 may be generally used molds so long as they can adapt a laminated body having such a shape as a plane shape, a curved shape, or a spherical shape and can have a heat capacity suitable for processing.

Specifically, for example, metallic materials such as aluminum (Al) and nickel (Ni), steel materials for molds such as NAK80 and STAVAX, glass, and ceramics can be used as a material of the mold. The temperature adjuster includes a temperature adjusting heater attached to the inside or the outside of the mold. A surface of the mold may be subjected to a general heat resistance treatment, a general release treatment, or both thereof.

Furthermore, the movable mold 221 and the fixed mold 212 may have an eject mechanism such as a pushing pin configured to extract the molded body from the mold.

In the present embodiment, temperatures of the movable mold 221 and the fixed mold 212 are lower than the softening temperature of the resin substrate (support) 11. This makes it possible to prevent the support from being softened and to prevent damage to the electrically conductive layer. Note that, the temperatures of the movable mold 221 and the fixed mold 212 can be set within a range of, for example, 40° C. or more but 150° C. or less.

Furthermore, in the present embodiment, as presented in FIG. 11A to FIG. 11C, onto the resin substrate 11 exposed, a third resin that is at least one selected from the group consisting of a resin of the same kind as the second resin and a resin having a softening temperature equal to or lower than a softening temperature of the second resin is injected from a direction that is substantially parallel to a surface of the resin substrate 11, to integrally form the resin layer 14. This makes it possible to improve fluidity and a filling speed of the resin to be discharged, to improve profile irregularity of a molded body, and to prevent damage to the insert sheet 151 including the electrically conductive layer 12, the underlying layer 13, and the support (resin substrate) 11 due to shearing force of a resin to be injected.

In the present disclosure, a melt volume-flow rate of the resin that is injected when the resin layer 14 is formed is 14 $cm^3$/10 min or more, the melt volume-flow rate being determined according to ISO 1133. In the injection molding, as fluidity of the resin injected is higher, damage to the insert sheet 151 (particularly, electrically conductive layer 12) due to sharing force can be decreased. Therefore, when the melt volume-flow rate of the resin of which the resin layer 14 is formed is 14 $cm^3$/10 min or more, damage such as occurrence of cracks in the electrically conductive layer 12 can be further prevented.

EXAMPLES

Hereinafter, the present disclosure will be described by way of Examples. However, the present disclosure should not be construed as being limited to these Examples.

Example 1

In Example 1, one example of the electrically conductive layer-formed substrate (electrically conductive transparent substrate) 10 described in the first embodiment was produced. The electrically conductive layer-formed substrate prepared in Example 1 is useful for a constituent component of an electronic device.

As a resin substrate (support), a polycarbonate sheet (PC2151, available from TEIJIN LIMITED, second resin) having an average thickness of 0.3 mm and a plane shape presented in FIG. 5 was provided.

When the coefficient of thermal expansion of the resin substrate in a temperature range of from 25° C. (room temperature) through 146° C. was measured using a TMA apparatus (available from Rigaku Corporation, Thermo plus EVO II), the coefficient of thermal expansion was "1.7%".

Note that, the coefficient of thermal expansion was measured under the following conditions.

Tensile load: 20 mN

Temperature range: Room temperature through 160° C.

Heating rate: 5° C./min

Sample shape for measurement: Width: 5 mm×length 20 mm×depth: 0.3 mm

Subsequently, an underlying layer was formed on the resin substrate. Materials of the underlying layer used were a dispersion liquid of inorganic particles and propylene glycolmonomethyl ether (PGM-AC4130Y, available from Nissan Chemical Corporation, methacryl surface treatment: $SiO_2$, average particle diameter: 40 nm to 50 nm) as the inorganic particles; and a urethane acrylate resin (UX5000, available from Nippon Kayaku Co., Ltd., softening temperature after curing: 97° C.) as the first resin. An amount of the inorganic particles was adjusted so that it was 80% by mass relative to the total amount of the first resin. As a photoinitiator, 4% by mass of Omnirad TPO H (available from IGM Resins B. V.) was added thereto relative to the total amount of the first resin. A coating liquid diluted with 2-ethoxyethanol was coated using a bar coater and was dried at 80° C. for 180 sec. Then, it was cured through UV irradiation to thereby form an underlying layer having an average thickness of 4 μm.

When the resin substrate on which the underlying layer was formed was measured for a coefficient of thermal expansion in a temperature range of from 25° C. (room temperature) through 146° C. using a TMA apparatus (available from Rigaku Corporation, Thermo plus EVO II), the coefficient of thermal expansion was "1.1%". The reason for this is as follows. Specifically, it is believed that the coefficient of thermal expansion of the underlying layer smaller than the coefficient of thermal expansion of the resin substrate (support) decreased the coefficient of thermal expansion.

Then, an electrically conductive layer was formed on the underlying layer to thereby produce an electrically conductive layer-formed substrate 1 (insert sheet 1).

In formation of the electrically conductive layer, a target of AgPdCu alloy (APC) (available from Furuya Metal Co., Ltd.) was used. A sputtering powder during film formation was set to 3 kW, and an average thickness of the electrically conductive layer was set to 100 nm by adjusting film formation time. A sputtering device used was SOLARIS (available from Oerlikon). A thickness of the electrically conductive layer was measured using Alpha-Step D-500 (available from KLA-Tenchore).

When Loresta-GP (available from Mitsubishi Chemical Analytech Co., Ltd.) was used as a four-terminal resistance measuring machine to measure a sheet resistance of the formed electrically conductive layer, the electrically conductive layer was found to have a sheet resistance of 10 mΩ/square or less.

Then, the curved surface forming apparatus 100 was used to process the electrically conductive layer-formed substrate 1 so as to have a 3D curved shape. In this processing, a concave mold having a spherical surface with a radius of curvature of 131 mm and a diameter of 200 mm was provided. As the elastic sheet, a silicone rubber sheet having an average thickness of 0.3 mm was used.

The concave mold used having a spherical surface was formed of an aluminum alloy according to JIS A7075. After a temperature of the concave mold was adjusted to 140° C., an electrically conductive layer-formed substrate 1 as an insert sheet was placed on the elastic sheet, and the elastic sheet and the electrically conductive layer-formed substrate 1 adhere to the concave mold for 90 seconds through pump suction so as to be plastically deformed.

By stopping the operation of the intake and exhaust pump and opening the hole to an atmosphere, the elastic sheet and the electrically conductive layer-formed substrate 1 were removed from the mold to thereby obtain the electrically conductive layer-formed substrate 1 in which a spherical 3D curved surface was formed. As the bending processing, both convex processing and concave processing were performed, and the insert sheet 1 subjected to preforming was provided.

Next, in an insert injection molding apparatus 200, the electrically conductive layer-formed substrate 1 was set on a fixed mold, and a polycarbonate resin was injected after molds were closed to thereby integrally mold a resin layer. As a result, an electrically conductive layer-formed substrate 1 having such a shape that is presented in FIG. 1B and FIG. 1C was produced.

Note that, as an injection molding machine, α100iA (available from FANUC: mold closing of 100 t and injection of 50 t) was used. The fixed mold and the movable mold were prepared by subjecting a steel material for mold (STAVAX) to mirror finishing. A shape of the electrically conductive layer-formed substrate 1 was an optical lens having a diameter of 75.5 mm, a radius of curvature of 131 mm, and an average thickness of 2 mm.

As a third resin (resin of which the resin layer is formed) to be ejected, polycarbonate 1 (Iupilon CLS3400S, available from Mitsubishi Engineering-Plastics Corporation) was used by annealing it at 120° C. for 5 hours before injection.

The third resin had a melt volume-flow rate of 14.0 $cm^3$/10 min (measurement temperature of 300° C. and measurement load of 1.20 kgf) and a softening temperature of 145° C.

The condition of the injection molding was set as described below. An injection speed thereof was set to 17 $cm^3$/sec.

Mold temperature: 100° C./100° C. (fixed mold/movable mold)

Resin temperature: 280° C.

Dwell: 100 kg/$cm^2$

The electrically conductive layer in the electrically conductive layer-formed substrate 1 after mold processing was confirmed as to presence or absence of damage (cracks) through observation using LED reflected light and transmitted light. As a result, no crack occurred in both the convex processing and the concave processing. Materials and evaluation results in Example 1 are presented in Table 1.

Example 2

In Example 2, another example of an electrically conductive layer-formed substrate (electrically conductive transparent substrate) 10 described in the first embodiment was produced. The electrically conductive layer-formed substrate prepared in Example 2 is useful for a constituent component of an electronic device and a constituent component of a transparent heater.

In Example 2, an underlying layer was formed in the same manner as in Example 1 except that a urethane acrylate resin (UX5102D_P20, available from Nippon Kayaku Co., Ltd., softening temperature after curing: 140° C.) was used as the first resin of the underlying layer. When the support on which the underlying layer was formed was measured for a coefficient of thermal expansion using a TMA apparatus (available from Rigaku Corporation, Thermo plus EVO II), the coefficient of thermal expansion was "1.0%". The reason for this is as follows. Specifically, it is believed that the coefficient of thermal expansion of the underlying layer smaller than the coefficient of thermal expansion of the resin substrate (support) decreased the coefficient of thermal expansion.

An ITO target ($In_2O_3$: 90% by mass and $SnO_2$: 10% by mass) was used to form an electrically conductive layer of an inorganic oxide on the underlying layer through the sputtering method. A sputtering power during film formation was set to 6.5 kW, an oxygen/argon (Ar) flow ratio was set to 3.6%, and an average thickness of the electrically conductive layer was adjusted by adjusting film formation time. A sputtering device used was SOLARIS (available from Oerlikon).

An average thickness of the electrically conductive layer was measured using Alpha-Step D-500 (available from KLA-Tenchore). Loresta-GP (available from Mitsubishi Chemical Analytech Co., Ltd.) was used as a four-terminal resistance measuring machine to measure a sheet resistance of the electrically conductive layer. In addition, transmittance at 550 nm was measured using a spectrophotometer UH4150 (available from Hitachi High-Tech Science Corporation).

The electrically conductive layer was found to have a sheet resistance of 50 Ω/square and a transmittance of 83%. Note that, when the electrically conductive layer-formed substrate is used as a transparent heater, the sheet resistance of the electrically conductive layer is preferably set to 500 Ω/square or more through adjustment of a film thickness.

Thereafter, in the same manner as in Example 1, an apparatus represented by the curved surface forming apparatus 100 was used to perform preforming, and then an apparatus represented by the insert injection molding apparatus 200 was used to integrally mold the resin layer to thereby produce an electrically conductive layer-formed substrate 2 having such a shape that is presented in FIG. 1B and FIG. 1C. An injection speed of the third resin was set to 28 $cm^3$/sec.

The electrically conductive layer in the electrically conductive layer-formed substrate 2 after mold processing was confirmed as to presence or absence of damage (cracks) through observation using LED reflected light and transmitted light. As a result, no crack occurred in the concave processing as presented in FIG. 1C. In the convex processing as presented in FIG. 1B, slight cracks were found within 5 mm from the peripheral end of the laminated body. Materials and evaluation results in Example 2 are presented in Table 1.

Example 3

In Example 3, another example of an electrically conductive layer-formed substrate (electrically conductive transparent substrate) 10 described in the first embodiment was produced. The electrically conductive layer-formed substrate prepared in Example 3 is useful for a constituent component of an electronic device and a constituent component of a transparent heater.

In Example 3, an underlying layer was formed in the same manner as in Example 2 except that a dispersion liquid of inorganic particles and propylene glycolmonomethyl ether (PGM-ST, available from Nissan Chemical Corporation, $SiO_2$, average particle diameter: 10 nm to 15 nm) was used as the inorganic particles of the underlying layer. When the support on which the underlying layer was formed was measured for a coefficient of thermal expansion in a temperature range of from 25° C. (room temperature) through 146° C. using a TMA apparatus (available from Rigaku Corporation, Thermo plus EVO II), the coefficient of thermal expansion was "1.0%". The reason for this is as follows. Specifically, it is believed that the coefficient of thermal expansion of the underlying layer smaller than the coefficient of thermal expansion of the resin substrate (support) decreased the coefficient of thermal expansion.

An average thickness of the underlying layer was set to 5 μm. Note that, the electrically conductive layer was formed in the same manner as in Example 2.

Thereafter, in the same manner as in Example 1, an apparatus represented by the curved surface forming apparatus 100 was used to perform preforming, and then an apparatus represented by the insert injection molding apparatus 200 was used to integrally mold the resin layer to thereby produce an electrically conductive layer-formed substrate 3 having such a shape that is presented in FIG. 1B and FIG. 1C.

The electrically conductive layer in the electrically conductive layer-formed substrate 3 after mold processing was confirmed as to presence or absence of damage (cracks) through observation using LED reflected light and transmitted light. As a result, no crack occurred in the concave processing. In the convex processing, slight cracks were found within 5 mm from the peripheral end of the electrically conductive layer-formed substrate 3. Materials and evaluation results in Example 3 are presented in Table 1.

Example 4

In Example 4, one example of the electronic device substrate 20 described in the second embodiment was produced. The electronic device substrate produced in Example 4 is useful for a constituent component of a transparent electrochromic device.

In Example 4, an underlying layer was formed in the same manner as in Example 3 except that an acid-modified epoxy acrylate oligomer resin (ZCR6002H, available from Nippon Kayaku Co., Ltd., softening temperature after curing: 205° C.) was used as the first resin in the underlying layer. When the support on which the underlying layer was formed was measured for a coefficient of thermal expansion using a TMA apparatus (available from Rigaku Corporation, Thermo plus EVO II), the coefficient of thermal expansion was "1.0%". The reason for this is as follows. Specifically, it is believed that the coefficient of thermal expansion of the underlying layer smaller than the coefficient of thermal expansion of the resin substrate (support) decreased the coefficient of thermal expansion.

Then, an electrically conductive layer was formed in the same manner as in Example 3, and a solution, which had been obtained by mixing (a) a radically polymerizable compound having triarylamine expressed by the following Structural Formula A, (b) polyethylene glycol diacrylate, (c) a photopolymerization initiator, and (d) tetrahydrofuran at a:b:c:d=10:5:0.15:85 (mass ratio), was coated on the electrically conductive layer and then was cured with ultraviolet rays (UV) in a nitrogen atmosphere to thereby form an oxidation-reactive electrochromic layer having an average film thickness of 1.5 μm as the electronic material layer.

<<Structural Formula A>>

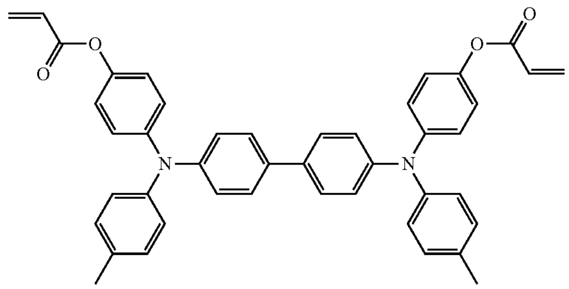

As polyethylene glycol diacrylate, KAYARAD PEG400DA (available from Nippon Kayaku Co., Ltd.) was used. As the photopolymerization initiator, IRGACURE 184 (available from IGM Resins B. V.) was used. In the second embodiment, the electrically conductive layer 12 and the electronic material layer 15 are more narrowly formed compared to the resin substrate 11 and the underlying layer 13. However, the underlying layer, the electrically conductive layer, and the electronic material layer were formed on the whole of the upper surface of the resin substrate in Example 4.

In Example 4, polycarbonate 2 (AD5503, available from TEIJIN LIMITED) was used as the third resin and was used by annealing it at 120° C. for 5 hours before injection.

The third resin had a melt volume-flow rate of 59.0 $cm^3$/10 min (measurement temperature of 300° C. and measurement load of 1.20 kgf) and a softening temperature of 145° C. An injection speed thereof was set to 28 $cm^3$/sec.

The other conditions were the same as those in Example 3, and the resin layer was integrally molded to thereby produce an electronic device substrate 4 having such a shape that is presented in FIG. 2B and FIG. 2C.

The electrically conductive layer in the electronic device substrate 4 after mold processing was confirmed as to presence or absence of damage (cracks) through observation using LED reflected light and transmitted light. As a result, no crack occurred in both the convex processing and the concave processing. Materials and evaluation results in Example 4 are presented in Table 1.

Example 5

In Example 5, one example of the electrically conductive substrate 30 described in the third embodiment was produced. The electrically conductive substrate prepared in Example 5 is useful for a constituent component of an electronic device and a constituent component of a transparent heater.

In Example 5, a dispersion liquid of inorganic particles and propylene glycolmonomethyl ether (PGM-AC2140Y, available from Nissan Chemical Corporation, methacryl surface treatment: $SiO_2$, average particle diameter: 10 nm to 15 nm) as the inorganic particles of the underlying layer, and an acid-modified epoxy urethane acrylate oligomer resin (ZCR6002H, available from Nippon Kayaku Co., Ltd., softening temperature after curing: 205° C.) as the first resin were used. An underlying layer having an average thickness of 4 μm was formed in the same manner as in Example 2 except that an amount of the inorganic particles was adjusted so as to be 150% by mass relative to the total amount of the first resin. When the support on which the underlying layer was formed was measured for a coefficient of thermal expansion using a TMA apparatus (available from Rigaku Corporation, Thermo plus EVO II), the coefficient of thermal expansion was "0.9%". The reason for this is as follows. Specifically, it is believed that the coefficient of thermal expansion of the underlying layer smaller than the coefficient of thermal expansion of the resin substrate (support) decreased the coefficient of thermal expansion.

Next, provided were two electrically conductive layer-formed substrates before preforming on each of which an electrically conductive layer was formed in the same manner as in Example 2. Then, the two electrically conductive layer-formed substrates were pasted with each other using a double-sided adhesion layer having an average thickness of 50 μm. As the double-sided adhesion layer, LA50 (OCA tape) (available from Nitto Denko Corporation) was used.

The other conditions were the same as those in Example 2, and the resin layer was integrally molded to thereby produce an electrically conductive substrate 5.

Note that, as the third resin, polycarbonate 2 (AD5503, available from TEIJIN LIMITED) was used by annealing it at 120° C. for 5 hours before injection.

The third resin had a melt volume-flow rate of 59.0 $cm^3$/10 min (measurement temperature of 300° C. and measurement load of 1.20 kgf) and a softening temperature of 145° C. An injection speed thereof was set to 28 $cm^3$/sec. The resin temperature was set to 280° C.

The electrically conductive layer in the electrically conductive substrate 5 after mold processing was confirmed as to presence or absence of damage (cracks) through observation using LED reflected light and transmitted light. As a result, no crack occurred even after the convex processing. Materials and evaluation results in Example 5 are presented in Table 1.

Example 6

In Example 6, another example of the electrically conductive substrate 30 described in the third embodiment was produced. The electrically conductive substrate prepared in Example 6 is useful for a constituent component of an electronic device and a constituent component of a transparent heater.

In Example 6, materials of the underlying layer used were a dispersion liquid of inorganic particles and propylene glycolmonomethyl ether (PGM-AC2140Y, available from Nissan Chemical Corporation, methacryl surface treatment, average particle diameter: 10 nm to 15 nm, $SiO_2$) as the inorganic particles, and an acid-modified epoxy urethane acrylate oligomer resin (ZCR6001H, available from Nippon Kayaku Co., Ltd., softening temperature after curing: 198°

C.) as the first resin. An underlying layer having an average thickness of 4 μm was formed in the same manner as in Example 5 except that an amount of the inorganic particles was adjusted so that an amount of the inorganic particles and the resin was 150% by mass relative to the total amount of the first resin.

When the support on which the underlying layer was formed was measured for a coefficient of thermal expansion using a TMA apparatus (available from Rigaku Corporation, Thermo plus EVO II), the coefficient of thermal expansion was "0.9%". The reason for this is as follows. Specifically, it is believed that the coefficient of thermal expansion of the underlying layer smaller than the coefficient of thermal expansion of the resin substrate (support) decreased the coefficient of thermal expansion.

The other conditions were the same as those in Example 5, and the resin layer was integrally molded to thereby produce an electrically conductive substrate 6.

Note that, as the third resin, a polycarbonate copolymer material 3 (SP5570, available from TEIJIN LIMITED) was used by annealing it at 120° C. for 5 hours before injection.

The third resin had a melt volume-flow rate of 59.0 $cm^3$/10 min (measurement temperature of 300° C. and measurement load of 1.20 kgf) and a softening temperature of 142° C. An injection speed thereof was set to 28 $cm^3$/sec. The resin temperature was set to 280° C.

The electrically conductive layer in the electrically conductive substrate 6 after mold processing was confirmed as to presence or absence of damage (cracks) through observation using LED reflected light and transmitted light. As a result, no crack occurred in the convex processing. Materials and evaluation results in Example 6 are presented in Table 1.

Example 7

In Example 7, another example of the electrically conductive substrate 30 described in the third embodiment was produced. The electrically conductive substrate prepared in Example 7 is useful for a constituent component of an electronic device and a constituent component of a transparent heater.

In Example 7, an electrically conductive substrate 7 where the resin layer was integrally molded was produced in the same manner as in Example 6 except that a polycarbonate material (AD5503, available from TEIJIN LIMITED, softening temperature: 145° C.) was used as the second resin in the support and an injection molding sheet having an average thickness of 0.35 mm was used.

The electrically conductive layer in the electrically conductive substrate 7 after mold processing was confirmed as to presence or absence of damage (cracks) through observation using LED reflected light and transmitted light. As a result, no crack occurred in the convex processing. Materials and evaluation results in Example 7 are presented in Table 1.

Example 8

In Example 8, another example of an electrically conductive substrate 30 described in the third embodiment was produced. The electrically conductive substrate produced in Example 8 is useful for a constituent component of an electronic device and a constituent component of a transparent heater.

In Example 8, a polycarbonate material (SH1126Z, available from TEIJIN LIMITED, softening temperature: 131° C.) was used as the second resin in the support, an injection molding sheet having an average thickness of 0.35 mm was provided, and an ITO target ($In_2O_3$: 99% by mass and $SnO_2$: 1% by mass) was used to form an electrically conductive layer of an inorganic oxide on an underlying layer through the sputtering method. A sputtering power during film formation was set to 6.5 kW, an oxygen/argon (Ar) flow ratio was set to 2.5%, and an average thickness of the electrically conductive layer was adjusted by adjusting film formation time. A sputtering device used was SOLARIS (available from Oerlikon). When the support was measured for a coefficient of thermal expansion in a temperature range of from 25° C. (room temperature) through a softening temperature of 131° C. using a TMA apparatus (available from Rigaku Corporation, Thermo plus EVO II), the coefficient of thermal expansion was "0.8%".

An average thickness of the electrically conductive layer was measured using Alpha-Step D-500 (available from KLA-Tenchore). Loresta-GP (available from Mitsubishi Chemical Analytech Co., Ltd.) was used as a four-terminal resistance measuring machine to measure a sheet resistance of the electrically conductive layer. In addition, transmittance at 550 nm was measured using a spectrophotometer UH4150 (available from Hitachi High-Tech Science Corporation).

The electrically conductive layer was found to have a sheet resistance of 75 Ω/square and a transmittance of 80%. Note that, when the electrically conductive substrate is used as a transparent heater, the sheet resistance of the electrically conductive layer is preferably set to 500 Ω/square or more through adjustment of a film thickness. The other conditions were the same as those in Example 7, and the resin layer was integrally molded to thereby produce an electrically conductive substrate 8.

Note that, as the third resin in the resin layer, a polycarbonate material 4 (SH1126Z, available from TEIJIN LIMITED) was used by annealing it at 120° C. for 5 hours before injection.

The third resin had a melt volume-flow rate of 26.0 $cm^3$/10 min (measurement temperature of 300° C. and measurement load of 1.20 kgf) and a softening temperature of 131° C. An injection speed thereof was set to 28 $cm^3$/sec. The resin temperature was set to 280° C. In Example 8, an electrically conductive substrate 8 of Example 8 was produced in the same manner as in Example 7 except for the changes described above.

The electrically conductive layer in the electrically conductive substrate 8 after mold processing was confirmed as to presence or absence of damage (cracks) through observation using LED reflected light and transmitted light. As a result, no crack occurred even after the convex processing. Materials and evaluation results in Example 8 are presented in Table 1.

Example 9

In Example 9, another example of an electrically conductive substrate 30 described in the third embodiment was produced. The electrically conductive substrate produced in Example 9 is useful for a constituent component of an electronic device and a constituent component of a transparent heater.

In Example 9, a polycarbonate sheet (PC2151, available from TEIJIN LIMITED) having an average thickness of 0.2 mm was provided as the second resin in the resin substrate (support).

As materials of the underlying layer, a dispersion liquid of inorganic particles and propylene glycolmonomethyl ether (PGM-ST, available from Nissan Chemical Corporation, average particle diameter: 10 nm to 15 nm, $SiO_2$) as the inorganic particles, and an acid-modified epoxy acrylate oligomer resin (ZCR6002H, available from Nippon Kayaku Co., Ltd.) as the first resin were used. The material of the underlying layer produced was used to form an underlying layer having an average film thickness of 4 μm on both sides of the support (* in Table 1). The other conditions were the same as those in Example 8, and the resin layer was integrally molded to thereby produce an electrically conductive substrate 9.

The electrically conductive layer in the electrically conductive substrate 9 after mold processing was confirmed as to presence or absence of damage (cracks) through observation using LED reflected light and transmitted light. As a result, no crack occurred even after the convex processing. Materials and evaluation results in Example 9 are presented in Table 1.

Example 10

In Example 10, one example of the electronic device substrate 40 described in the fourth embodiment was produced. The electronic device substrate produced in Example 10 is useful for a constituent component of an electrochromic device.

In Example 10, a polycarbonate sheet (PC2151, available from TEIJIN LIMITED, average thickness: 0.2 mm) was provided as the second resin in the resin substrate (support).

Materials of the underlying layer used were a dispersion liquid of inorganic particles and propylene glycolmonomethyl ether (PGM-AC4130Y, available from Nissan Chemical Corporation, methacryl surface treatment, average particle diameter: 40 nm to 50 nm, $SiO_2$) as the inorganic particles, and a urethane acrylate resin (UX5102D_P20, available from Nippon Kayaku Co., Ltd., softening temperature after curing: 140° C.) as the first resin. An amount of the inorganic particles was adjusted so that an amount of the inorganic particles and the resin was 80% by mass relative to the total amount of the first resin. As a photo-initiator, 4% by mass of Omnirad TPO H (available from IGM Resins B. V.) was added thereto relative to the total amount of the first resin. A coating liquid diluted with 2-ethoxyethanol was coated using a bar coater and was dried at 80° C. for 180 sec. Then, it was cured through UV irradiation to thereby form an underlying layer having an average thickness of 3 μm.

Next, an ITO target ($In_2O_3$: 90% by mass and $SnO_2$: 10% by mass) was used to form an electrically conductive layer of an inorganic oxide on the underlying layer through the sputtering method. A sputtering power during film formation was set to 6.5 kW, an oxygen/argon flow ratio ($O_2$ flow ratio) was set to 3.6%, and an average thickness of the electrically conductive layer was adjusted to 110 nm by adjusting film formation time. A sputtering device used was SOLARIS (available from Oerlikon).

Using a mask, the electrically conductive layer was formed on one resin substrate (support) in a region presented in FIG. 6A and the electrically conductive layer was formed on the other resin substrate (support) in a region presented in FIG. 6B. An average thickness of the electrically conductive layer was measured using Alpha-Step D-500 (available from KLA-Tenchore).

Next, in the resin substrate (support) in which the electrically conductive layer was formed in a region presented in FIG. 6B, an oxidation-reactive electrochromic layer was formed in a region presented in FIG. 6C through the coating method. The electrochromic layer was formed under the same conditions as those in Example 4.

In the resin substrate (support) in which the electrically conductive layer was formed in a region presented in FIG. 6A, a reduction-reactive electrochromic layer was formed in a region presented in FIG. 6C. In formation of the reduction-reactive electrochromic layer, a solution, which was obtained by adding 1% by mass of polyvinyl butyral to a methanol dispersion liquid of tin oxide, was coated, and then the resultant was annealed at 120° C. for 5 minutes to thereby form a tin oxide layer of nanoparticles having a thickness of 3 μm.

Then, a solution, which was obtained by dissolving 2% by mass of a compound expressed by the following Structural Formula B in 2,2,3,3-tetrafluoropropanol, was subjected to a treatment of coating and adsorption on a surface of the tin oxide layer of nanoparticles, and then the resultant was annealed at 120° C. for 5 minutes. As the methanol dispersion liquid of tin oxide, Celnax (available from Nissan Chemical Corporation) was used.

<<Structural Formula B>>

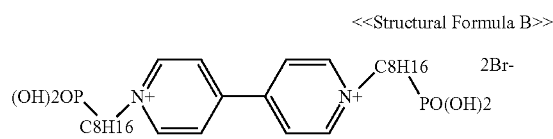

Next, an electrolyte solution, which was obtained by mixing (a) $(FSO_2)2N$-salt of 1-ethyl-3-methylimidazolium, (b) polyethylene glycol diacrylate, and (c) a photopolymerization initiator at a:b:c=2:1:0.01 (mass ratio), was prepared. Then, the electrolyte solution was filled between the oxidation-reactive electrochromic layer and the reduction-reactive electrochromic layer, and then an annealing treatment at 60° C. was performed for 1 minute. Then, they were cured by irradiation of ultraviolet rays and were pasted with each other to thereby prepare a pasted body. At this time, an amount of the electrolyte solution filled was adjusted so that an average thickness of the solid electrolyte layer was 30 μm.

As the polyethylene glycol diacrylate, KAYARAD PEG400DA (available from Nippon Kayaku Co., Ltd.) was used. As the photopolymerization initiator, IRGACURE 184 (available from IGM Resins B. V.) was used. Furthermore, a UV curable acrylic material to which inorganic particles (oxide) had been added was filled around the electronic material layer, and was cured with UV to thereby form a seal part (protective layer). As the UV curable acrylic material including inorganic particles, TB3050B (available from ThreeBond) was used.

Thereafter, an electronic device substrate 10 where the resin layer was integrally molded was produced in the same manner as in Example 5.

Note that, as the third resin, a polycarbonate copolymer material 4 (SH1126Z, available from TEIJIN LIMITED) was provided and was used by annealing it at 100° C. for 5 hours before injection.

The third resin had a melt volume-flow rate of 26.0 $cm^3$/10 min (measurement temperature of 300° C. and measurement load of 1.20 kgf) and a softening temperature of 131° C. An injection speed thereof was set to 28 $cm^3$/sec. The resin temperature was set to 280° C.

The electrically conductive layer in the electronic device substrate 10 after mold processing was confirmed as to presence or absence of damage (cracks) through observation using LED reflected light and transmitted light. As a result, no crack occurred in the concave processing. In the convex processing, slight cracks were found within 5 mm from the peripheral end of the laminated body.

Furthermore, a coloring/discoloring evaluation of the electronic device substrate 10 was performed. In this evaluation, voltage of 2.0 V was applied and charges of 7 mC/cm$^2$ were injected so that one drawer part of the electronic material layer exposed from the protective layer (seal member) became a plus pole, and the other drawer part of the electronic material layer exposed from the protective layer (seal member) became a minus pole. As a result, it was confirmed that the oxidation-reactive electrochromic layer turned blue green and the reduction-reactive electrochromic layer turned blue. Moreover, it was confirmed that application of voltage of −0.6 V caused the color to be transparent and the coloring/discoloring operation was normally performed. Note that, a light transmittance was measured using an ultraviolet-visible near infrared spectrophotometer UH4150 (available from Hitachi High-Tech Science Corporation). Materials and evaluation results in Example 8 are presented in Table 1.

Example 11

In Example 11, one example of the electronic device substrate 40 described in the fourth embodiment was produced. The electronic device substrate produced in Example 11 is useful for a constituent component of an electrochromic device.

In Example 11, a polycarbonate sheet (PC2151, available from TEIJIN LIMITED, average thickness: 0.3 mm) was provided as the second resin in the resin substrate (support).

As materials of the underlying layer, a dispersion liquid of inorganic particles and propylene glycolmonomethyl ether (PGM-ST, available from Nissan Chemical Corporation, average particle diameter: 10 nm to 15 nm, $SiO_2$) as the inorganic particles, and an acid-modified epoxy acrylate oligomer resin (ZCR6002H, available from Nippon Kayaku Co., Ltd.) as the first resin were used. An amount of the inorganic particles was adjusted so that an amount of the inorganic particles and the resin was 150% by mass relative to the total amount of the first resin, and an underlying layer was formed so as to have an average film thickness of 3 μm.

The other conditions were the same as those in Example 10, and the resin layer was integrally molded to thereby produce an electronic device substrate 11.

In Example 11, a polycarbonate copolymer material 4 (SP5580, available from TEIJIN LIMITED) was used as the third resin, and was used by annealing it at 110° C. for 5 hours before injection.

The third resin had a melt volume-flow rate of 54.0 cm$^3$/10 min (measurement temperature of 300° C. and measurement load of 1.20 kgf) and a softening temperature of 131° C. An injection speed thereof was set to 28 cm$^3$/sec.

The electrically conductive layer in the electronic device substrate 11 after mold processing was confirmed as to presence or absence of damage (cracks) through observation using LED reflected light and transmitted light. As a result, no crack occurred in both the convex processing and the concave processing.

Furthermore, a coloring/discoloring evaluation of the electronic device substrate 11 was performed. In this evaluation, voltage of 2.0 V was applied and charges of 7 mC/cm$^2$ were injected so that one drawer part of the electronic material layer exposed from the protective layer (seal member) became a plus pole, and the other drawer part of the electronic material layer exposed from the protective layer (seal member) became a minus pole. As a result, it was confirmed that the oxidation-reactive electrochromic layer turned blue green and the reduction-reactive electrochromic layer turned blue. Moreover, it was confirmed that application of voltage of −0.6 V caused the color to be transparent and the coloring/discoloring operation was normally performed. Note that, a light transmittance was measured using an ultraviolet-visible near infrared spectrophotometer UH4150 (available from Hitachi High-Tech Science Corporation). Materials and evaluation results in Example 11 are presented in Table 1.

Example 12

In Example 12, one example of the electronic device substrate 40 described in the fourth embodiment was produced. The electronic device substrate produced in Example 12 is useful for a constituent component of an electrochromic device.

In Example 12, as materials of the underlying layer, a dispersion liquid of inorganic particles and propylene glycolmonomethyl ether (PGM-AC2140Y, available from Nissan Chemical Corporation, methacryl surface treatment, average particle diameter: 10 nm to 15 nm, $SiO_2$) as the inorganic particles, and an acid-modified epoxy acrylate oligomer resin (ZCR6002H, available from Nippon Kayaku Co., Ltd.) as the first resin were used. An amount of the inorganic particles was adjusted so that an amount of the inorganic particles and the resin was 150% by mass relative to the total amount of the first resin, and an underlying layer having an average film thickness of 3 μm was formed.

The other conditions were the same as those in Example 11, and the resin layer was integrally molded to thereby produce an electronic device substrate 12.

In Example 12, a polycarbonate material 5 (Iupilon KH3310UR, available from Mitsubishi Engineering-Plastics Corporation) was used as the third resin and was used by annealing it at 100° C. for 5 hours before injection.

The third resin had a melt volume-flow rate of 33.0 cm$^3$/10 min (measurement temperature of 300° C. and measurement load of 1.20 kgf) and a softening temperature of 127° C. An injection speed thereof was set to 28 cm$^3$/sec. The temperature of the resin was set to 270° C., the temperatures of the molds were set to 100° C./100° C. (fixed mold/movable mold), and the dwell was set to 100 kg/cm$^2$. As a result, a lens having a thickness of 2 mm was molded.

In Example 12, a paste, which included, as the seal member (protective layer), $SiO_2$ inorganic particles (KE-S S30, available from NIPPON SHOKUBAI CO., LTD.) having an average particle diameter of 0.3 μm and a UV curable resin (SK3200, available from Dexerials Corporation, softening temperature after curing: 106° C.), and was adjusted so that an amount of the inorganic particles was 100% by mass relative to the total amount of the UV curable resin, was used and was coated around the electronic material layer.

The electrically conductive layer in the electronic device substrate 12 after mold processing was confirmed as to presence or absence of damage (cracks) through observation using LED reflected light and transmitted light. As a result, no crack occurred in both the convex processing and the concave processing.

Furthermore, a coloring/discoloring evaluation of the electronic device substrate 12 was performed. In this evaluation, voltage of 2.0 V was applied and charges of 7 mC/

$cm^2$ were injected so that one drawer part of the electronic material layer exposed from the protective layer (seal member) became a plus pole, and the other drawer part of the electronic material layer exposed from the protective layer (seal member) became a minus pole. As a result, it was confirmed that the oxidation-reactive electrochromic layer turned blue green and the reduction-reactive electrochromic layer turned blue. Moreover, it was confirmed that application of voltage of −0.6 V caused the color to be transparent and the coloring/discoloring operation was normally performed. Note that, a light transmittance was measured using an ultraviolet-visible near infrared spectrophotometer UH4150 (available from Hitachi High-Tech Science Corporation). Materials and evaluation results in Example 12 are presented in Table 1.

Example 13

In Example 13, one example of the electronic device substrate 40 described in the fourth embodiment was produced. The electronic device substrate produced in Example 13 can be used as an electrochromic electronic light-adjusting lens.

In Example 13, an electronic device substrate 13 where the resin layer was integrally molded was produced in the same manner as in Example 12. In Example 13, preforming was not performed, and a polycarbonate material 5 (Iupilon KH3310UR, available from Mitsubishi Engineering-Plastics Corporation) was provided as the third resin and was used by annealing it at 100° C. for 5 hours before injection.

The third resin had a melt volume-flow rate of 33.0 $cm^3$/10 min (measurement temperature of 300° C. and measurement load of 1.20 kgf) and a softening temperature of 127° C. An injection speed thereof was set to 2.8 $cm^3$/sec. The temperature of the resin was set to 260° C., the temperatures of the molds were set to 100° C./100° C. (fixed mold/movable mold), and the dwell was set to 900 kg/$cm^2$. As a result, a lens having a thickness of 10 mm was molded.

In Example 13, the welding resin on the back of the curved substrate that had undergone the insert molding was cut and polished, and then processing of prescription strength of −1 diopter was performed. Then, the outer diameter was processed so that an area within 2 mm from the edge of the area where the organic electronic material layer is formed (15*a*, 15*b*, and 15*c*) became a lens for spectacles to thereby obtain an electrochromic electronic light-adjusting lens (electronic device substrate 9) with prescription strength. Note that, a central position of prescription strength at the time of cutting and polishing the back was not a center of the curved surface, and was adjusted and processed depending on position of eyes within a lens.

The electrically conductive layer in the electronic device substrate 13 after mold processing was confirmed as to presence or absence of damage (cracks) through observation using LED reflected light and transmitted light. As a result, no crack occurred in both the convex processing and the concave processing.

In addition, the coloring/discoloring evaluation of the electronic device substrate 13 (electronic light-adjusting lens) was performed. In this evaluation, voltage of 2.0 V was applied and charges of 7 mC/$cm^2$ were injected so that one drawer part of the electronic material layer exposed from the protective layer (seal member) became a plus pole, and the other drawer part of the electronic material layer exposed from the protective layer (seal member) became a minus pole.

As a result, it was confirmed that the oxidation-reactive electrochromic layer turned blue green and the reduction-reactive electrochromic layer turned blue. Moreover, it was confirmed that application of voltage of −0.6 V caused the color to be transparent and the coloring/discoloring adjusting operation was normally performed. Note that, a light transmittance was measured using an ultraviolet-visible near infrared spectrophotometer UH4150 (available from Hitachi High-Tech Science Corporation). Materials and evaluation results in Example 9 are presented in Table 1.

Example 14

In Example 14, one example of the electronic device substrate 40 described in the fourth embodiment was produced. The electronic device substrate produced in Example 14 can be used as an electrochromic electronic light-adjusting lens.

In Example 14, preforming was not performed, and a polycarbonate material 4 (SH1126Z, available from TEIJIN LIMITED) as the third resin was used by annealing it at 120° C. for 5 hours before injection.

The third resin had a melt volume-flow rate of 26.0 $cm^3$/10 min (measurement temperature of 300° C. and measurement load of 1.20 kgf) and a softening temperature of 131° C. An injection speed thereof was set to 28 $cm^3$/sec. The temperature of the resin was set to 260° C., the temperatures of the molds were set to 100° C./100° C. (fixed mold/movable mold), and the dwell was set to 900 kg/$cm^2$. As a result, a lens having a thickness of 10 mm was molded.

In Example 14, the resin layer subjected to insert molding on the back surface of the curved substrate was cut and polished in the same manner as in Example 13 to form a lens having a thickness of 2 mm.

The electrically conductive layer in the electronic device substrate 14 after mold processing was confirmed as to presence or absence of damage (cracks) through observation using LED reflected light and transmitted light. As a result, no crack occurred in both the convex processing and the concave processing.

Furthermore, a coloring/discoloring evaluation of the electronic device substrate 14 was performed. In this evaluation, voltage of 2.0 V was applied and charges of 7 mC/$cm^2$ were injected so that one drawer part of the electronic material layer exposed from the protective layer (seal member) became a plus pole, and the other drawer part of the electronic material layer exposed from the protective layer (seal member) became a minus pole. As a result, it was confirmed that the oxidation-reactive electrochromic layer turned blue green and the reduction-reactive electrochromic layer turned blue. Moreover, it was confirmed that application of voltage of −0.6 V caused the color to be transparent and the coloring/discoloring operation was normally performed. Note that, a light transmittance was measured using an ultraviolet-visible near infrared spectrophotometer UH4150 (available from Hitachi High-Tech Science Corporation). Materials and evaluation results in Example 14 are presented in Table 1.

Example 15

In Example 15, one example of the electronic device substrate 40 described in the fourth embodiment was produced. The electronic device substrate produced in Example 15 is useful for a constituent component of an electrochromic device.

In Example 15, polyethylene terephthalate (Lumirror, available from Toray Industries, Inc., softening temperature of the support: 150° C. or more) having an average thickness of 0.3 mm was provided as the resin substrate (support).

As materials of the underlying layer, a dispersion liquid of inorganic particles and propylene glycolmonomethyl ether (PGM-AC4130Y, available from Nissan Chemical Corporation, methacryl surface treatment, average particle diameter: 40 nm to 50 nm, $SiO_2$) as the inorganic particles and a urethane acrylate resin (UX5102D_P20, available from Nippon Kayaku Co., Ltd., softening temperature after curing: 140° C.) as the first resin were used. An amount of the inorganic particles was adjusted so that an amount of the inorganic particles and the resin was 150% by mass relative to the total amount of the first resin, and an underlying layer was formed so as to have an average film thickness of 3 μm.

The other conditions were the same as those in Example 12, and the resin layer was integrally molded to thereby produce an electronic device substrate 15.

In Example 15, a polycarbonate material 4 (SH1126Z, available from TEIJIN LIMITED) was used as the third resin and was used by annealing it at 120° C. for 5 hours before injection.

The third resin had a melt volume-flow rate of 26.0 $cm^3$/10 min (measurement temperature of 300° C. and measurement load of 1.20 kgf) and a softening temperature of 131° C. An injection speed thereof was set to 28 $cm^3$/sec. The resin temperature was set to 280° C.

The electrically conductive layer in the electronic device substrate 15 after mold processing was confirmed as to presence or absence of damage (cracks) through observation using LED reflected light and transmitted light. As a result, no crack occurred in the concave processing. In the convex processing, slight cracks were found within 5 mm from the peripheral end of the laminated body.

Furthermore, a coloring/discoloring evaluation of the electronic device substrate 15 was performed. In this evaluation, voltage of 2.0 V was applied and charges of 7 mC/$cm^2$ were injected so that one drawer part of the electronic material layer exposed from the protective layer (seal member) became a plus pole, and the other drawer part of the electronic material layer exposed from the protective layer (seal member) became a minus pole. As a result, it was confirmed that the oxidation-reactive electrochromic layer turned blue green and the reduction-reactive electrochromic layer turned blue. Moreover, it was confirmed that application of voltage of −0.6 V caused the color to be transparent and the coloring/discoloring operation was normally performed. Note that, a light transmittance was measured using an ultraviolet-visible near infrared spectrophotometer UH4150 (available from Hitachi High-Tech Science Corporation). Materials and evaluation results in Example 15 are presented in Table 1.

Example 16

In Example 16, one example of the electronic device substrate 40 described in the fourth embodiment was produced. The electronic device substrate produced in Example 16 is useful for a constituent component of an electrochromic device.

In Example 16, an electronic device substrate 16 where the resin layer was integrally molded was produced in the same manner as in Example 12 except that the insert sheet in Example 12 (electrically conductive layer, underlying layer, and support) was set on a glass mold (a diameter of 75 mm, a thickness of 2 mm, and a curvature of 131 mm), a UV curable resin (SK3200, available from Dexerials Corporation, softening temperature after curing: 106° C.) as the third resin was charged thereinto, and it was cured with UV to thereby form a resin layer.

The electrically conductive layer in the electronic device substrate 16 after mold processing was confirmed as to presence or absence of damage (cracks) through observation using LED reflected light and transmitted light. As a result, no crack occurred in both the convex processing and the concave processing.

Furthermore, a coloring/discoloring evaluation of the electronic device substrate 16 was performed. In this evaluation, voltage of 2.0 V was applied and charges of 7 mC/$cm^2$ were injected so that one drawer part of the electronic material layer exposed from the protective layer (seal member) became a plus pole, and the other drawer part of the electronic material layer exposed from the protective layer (seal member) became a minus pole. As a result, it was confirmed that the oxidation-reactive electrochromic layer turned blue green and the reduction-reactive electrochromic layer turned blue. Moreover, it was confirmed that application of voltage of −0.6 V caused the color to be transparent and the coloring/discoloring operation was normally performed. Note that, a light transmittance was measured using an ultraviolet-visible near infrared spectrophotometer UH4150 (available from Hitachi High-Tech Science Corporation). Materials and evaluation results in Example 16 are presented in Table 1.

Comparative Example 1

In Comparative Example 1, an electrically conductive substrate 17 was produced in the same manner as in Example 5 except that the underlying layer was not formed in Example 5.

The electrically conductive layer in the electrically conductive substrate 17 was confirmed as to presence or absence of damage (cracks) through observation using LED reflected light and transmitted light. As a result, cracks occurred after the convex processing. Materials and evaluation results in Comparative Example 1 are presented in Table 1.

In addition, FIG. 13 presents a photomicrograph in which cracks are generated in the electrically conductive substrate 17 in Comparative Example 1. The figure at the lower-left hand in FIG. 13 presents a photographed position in the electrically conductive substrate 17.

Comparative Example 2

In Comparative Example 2, an electrically conductive substrate 18 was produced in the same manner as in Example 5 except that a cycloolefin copolymer (APL5013VH, available from Mitsui Chemicals, Inc., softening temperature: 129° C.) was used as the second resin in the support and an injection molding sheet having an average thickness of 0.35 mm was used.

The electrically conductive layer in the electrically conductive substrate 18 was confirmed as to presence or absence of damage (cracks) through observation using LED reflected light and transmitted light. As a result, cracks occurred after the convex processing. Materials and evaluation results in Comparative Example 2 are presented in Table 1.

Even in Comparative Example 2, cracks occurred similarly to the electrically conductive layer-formed substrate 17 of Comparative Example 1.

Comparative Example 3

An electrically conductive layer-formed substrate 19 was produced in the same manner as in Example 3 except that the inorganic particles dispersion liquid was not used as the underlying layer.

When the support on which the underlying layer was formed was measured for a coefficient of thermal expansion in a temperature range of from 25° C. (room temperature) through 146° C. using a TMA apparatus (available from Rigaku Corporation, Thermo plus EVO II), the coefficient of thermal expansion was "1.7%".

The electrically conductive layer in the electrically conductive layer-formed substrate 19 was confirmed as to presence or absence of damage (cracks) through observation using LED reflected light and transmitted light. As a result, cracks occurred both after the convex processing and after the concave processing. Materials and evaluation results in Comparative Example 3 are presented in Table 1.

Even in Comparative Example 3, cracks occurred similarly to the electrically conductive layer-formed substrate 17 of Comparative Example 1.

TABLE 1

| | | | | Underlying layer | | | | |
|---|---|---|---|---|---|---|---|---|
| | | | | | | Inorganic particles dispersion liquid | | |
| | | Embodiment | Electrically Conductive layer Material | First resin | Softening temperature (° C.) | Name | Amount of Inorganic panicles (% by mass) | Support Second resin (thickness) |
| Ex. | 1 | 10 | AgPdCu Alloy | UX5000 | 97 | PGM-AC4130Y | 80 | PC2151 (0.3 mm) |
| | 2 | 10 | $In_2O_3$: 90% $SnO_2$: 10% (ITO) | UX5102D__P20 | 140 | PGM-AC4130Y | 80 | PC2151 (0.3 mm) |
| | 3 | 10 | ITO | UX5102D__P20 | 140 | PGM-ST | 80 | PC2151 (0.3 mm) |
| | 4 | 20 | ITO | ZCR6002H | 205 | PGM-ST | 80 | PC2151 0.3 mm |
| | 5 | 30 | ITO | ZCR6002H | 205 | PGM-AC2140Y | 100 | PC2151 (0.3 mm) |
| | 6 | 30 | ITO | ZCR6001H | 198 | PGM-AC2140Y | 100 | PC2151 (0.3 mm) |
| | 7 | 30 | ITO | ZCR6001H | 198 | PGM-AC2140Y | 100 | AD5503 (0.35 mm) |
| | 8 | 30 | $In_2O_3$: 99% $ZrO_2$: 1% | ZCR6001H | 198 | PGM-AC2140Y | 100 | SH1126Z (0.35 mm) |
| | 9 | 30 | $In_2O_3$: 99% $ZrO_2$: 1% | ZCR6002H* | 205 | PGM-ST* | 100 | PC2151 (0.2 mm) |
| | 10 | 40 | ITO | UX5102D__P20 | 140 | PGM-AC4130Y | 80 | PC2151 (0.2 mm) |

| | | Support | | Resin layer | | | Evaluation Result Presence or absence of cracks | |
|---|---|---|---|---|---|---|---|---|
| | | Softening temperature (° C.) | Preforming | Third resin (thickness of molded body) | Softening temperature (° C.) | Melt volume-flow rate ($cm^3$/10 min) | Convex processing | Concave processing |
| Ex. | 1 | 146 | Yes | CLS3400S (2 mm) | 145 | 14.0 | A | A |
| | 2 | 146 | Yes | CLS3400S (2 mm) | 145 | 14.0 | B | A |
| | 3 | 146 | Yes | CLS3400S (2 mm) | 145 | 14.0 | B | A |
| | 4 | 146 | Yes | AD5503 (2 mm) | 145 | 59.0 | A | A |
| | 5 | 146 | Yes | AD5503 (2 mm) | 145 | 59.0 | A | |
| | 6 | 146 | Yes | SP5570 (2 mm) | 142 | 59.0 | A | |
| | 7 | 145 | Yes | SP5570 (2 mm) | 142 | 59.0 | A | |
| | 8 | 131 | Yes | SH1126Z (2 mm) | 131 | 26.0 | A | |
| | 9 | 146 | Yes | SH1126Z (2 mm) | 131 | 26.0 | A | |
| | 10 | 146 | Yes | SH1126Z (2 mm) | 131 | 26.0 | B | A |

TABLE 1-continued

| | | | | Underlying layer | | | | |
|---|---|---|---|---|---|---|---|---|
| | | | | | | Inorganic particles dispersion liquid | | |
| | | Embodiment | Electrically Conductive layer Material | First resin | Softening temperature (° C.) | Name | Amount of Inorganic particles (% by mass) | Support Second resin (thickness) |
| Ex. | 11 | 40 | ITO | ZCR6002H | 205 | PGM-ST | 100 | PC2151 (0.3 mm) |
| | 12 | 40 | ITO | ZCR6002H | 205 | PGM-AC2140Y | 100 | PC2151 (0.3 mm) |
| | 13 | 40 | ITO | ZCR6002H | 205 | PGM-AC2140Y | 100 | PC2151 (0.3 mm) |
| | 14 | 40 | ITO | ZCR6002H | 205 | PGM-AC2140Y | 100 | PC2151 (0.3 mm) |
| | 15 | 40 | ITO | UX5102D_P20 | 140 | PGM-AC4130Y | 100 | Lumirror (0.3 mm) |
| | 16 | 40 | ITO | ZCR6002H | 205 | PGM-AC2140Y | 100 | PC2151 (0.3 mm) |
| Comp. Ex. | 1 | 30 | ITO | | | None | | PC2151 (0.3 mm) |
| | 2 | 30 | ITO | ZCR6002H | 205 | PGM-AC2140Y | 100 | APL5013VH (0.35 mm) |
| | 3 | 10 | ITO | UX5102D_P20 | 140 | — | 0 | PC2151 (0.3 mm) |

| | | Support | | Resin layer | | | Evaluation Result Presence or absence of cracks | |
|---|---|---|---|---|---|---|---|---|
| | | Softening temperature (° C.) | Preforming | Third resin (thickness of molded body) | Softening temperature (° C.) | Melt volume-flow rate ($cm^3$/10 min) | Convex processing | Concave processing |
| Ex. | 11 | 146 | Yes | SP5580 (2 mm) | 131 | 54.0 | A | A |
| | 12 | 146 | Yes | KH3310UR (2 mm) | 127 | 33.0 | A | A |
| | 13 | 146 | No | KH3310UR (10 mm) | 127 | 33.0 | A | A |
| | 14 | 146 | No | SH1126Z (10 mm) | 131 | 26.0 | A | A |
| | 15 | 150 or more | Yes | SH1126Z (2 mm) | 131 | 26.0 | B | A |
| | 16 | 146 | Yes | SK3200 (2 mm) | 106 | — | A | A |
| Comp. Ex. | 1 | 146 | Yes | AD5503 (2 mm) | 145 | 59.0 | C | |
| | 2 | 129 | Yes | AD5503 (2 mm) | 145 | 59.0 | C | |
| | 3 | 146 | Yes | CLS3400S (2 mm) | 145 | 14.0 | C | C |

Here, the evaluation criteria of "Processing result" in Table 1 are presented as follows.

"A": No crack occurred in the electrically conductive layer.

"B": Slight cracks were found within 5 mm from the peripheral end of the electrically conductive layer (not problematic in terms of practical use).

"C": Large cracks were also found near a center of the electrically conductive layer.

As described above, the laminated structure of the present disclosure includes: an electrically conductive layer; an underlying layer formed of a resin; a support; and a resin layer formed of a resin having a lower softening temperature than a softening temperature of the resin of which the underlying layer is formed, the electrically conductive layer, the underlying layer, the support, and the resin layer being disposed in this order.

As a result, the laminated structure of the present disclosure can prevent damage to the electrically conductive layer in a high temperature environment.

Aspects of the present disclosure are as follows, for example.

<1> A laminated structure including:

an electrically conductive layer;

an underlying layer including a first resin and inorganic particles;

a support including a second resin; and a resin layer including a third resin that is at least one selected from the group consisting of a resin of same kind as the second resin and a resin having a softening temperature equal to or lower than a softening temperature of the second resin, the electrically conductive layer, the underlying layer, the support, and the resin layer being disposed in this order.

<2> The laminated structure according to <1>, further including another underlying layer between the support and the resin layer.

<3> The laminated structure according to <1> or <2>, wherein a coefficient of thermal expansion of the underlying layer is smaller than a coefficient of thermal expansion of the support.

<4> The laminated structure according to any one of <1> to <3>, wherein the electrically conductive layer is divided into a plurality of portions.

<5> The laminated structure according to any one of <1> to <4>, wherein the electrically conductive layer includes an inorganic oxide.

<6> The laminated structure according to any one of <1> to <5>, wherein a difference between the softening temperature of the second resin and a softening temperature of the third resin is 50° C. or less.

<7> The laminated structure according to any one of <1> to <6>, wherein the laminated structure is translucent.

<8> The laminated structure according to any one of <1> to <7>, wherein the resin layer is an optical lens.

<9> The laminated structure according to any one of <1> to <8>, wherein the second resin includes at least one selected from the group consisting of polycarbonate, polyethylene terephthalate, polybutylene terephthalate, polymethyl methacrylate, polyethylene, polypropylene, acrylonitrile•butadiene•styrene, polyoxymethylene, and urethane, or includes a copolymerized material of foregoing.

<10> The laminated structure according to any one of <1> to <9>, wherein the first resin includes at least one selected from the group consisting of acrylic resins, epoxy resins, urethane resins, silicone resins, and melamine resins.

<11> The laminated structure according to any one of <1> to <10>, wherein an amount of the inorganic particles in the underlying layer is 10% by mass or more relative to a total amount of the first resin.

<12> The laminated structure according to any one of <1> to <11>, wherein the third resin includes at least one selected from the group consisting of polycarbonate and polycarbonate copolymers.

<13> The laminated structure according to any one of <1> to <12>, wherein a melt volume-flow rate of the third resin is 14 $cm^3$/10 min or more, the melt volume-flow rate being determined according to ISO 1133.

<14> The laminated structure according to any one of <1> to <13>, further including:

an electronic material layer provided in contact with the electrically conductive layer; and another electrically conductive layer provided in contact with the electronic material layer.

<15> The laminated structure according to <14>, wherein the electronic material layer is an electrochromic layer.

<16> The laminated structure according to <15>, wherein the electrochromic layer includes an electrochromic portion and a solid electrolyte portion.

<17> A multiple laminated structure including two laminated structures each of which is the laminated structure according to any one of <1> to <16>, wherein the electrically conductive layers in the two laminated structures face each other via a layer to be sealed, and the multiple laminated structure includes a seal member including the first resin and the inorganic particles, and the seal member is between the two laminated structures, is at a side portion of the two laminated structures, or is between the two laminated structures and at a side portion of the two laminated structures.

<18> A lens including the laminated structure according to any one of <1> to <17>.

<19> A method for producing a laminated structure, the method including disposing, in a mold, an electrically conductive substrate including: an electrically conductive layer; an underlying layer including a first resin and inorganic particles; and a support including a second resin, the electrically conductive layer, the underlying layer, and the support being disposed in this order, so that the electrically conductive layer comes into contact with the mold, and injecting, onto the support exposed, a third resin that is at least one selected from the group consisting of a resin of same kind as the second resin and a resin having a softening temperature equal to or lower than a softening temperature of the second resin, to integrally form a resin layer.

<20> The method for producing a laminated structure according to <19>, wherein a temperature of the mold is equal to or lower than the softening temperature of the second resin.

<21> The method for producing a laminated structure according to <19> or <20>, wherein the injecting is injecting, onto the support exposed, the third resin having a softening temperature equal to or lower than the softening temperature of the second resin from a direction that is substantially parallel to a surface of the support, to integrally form the resin layer.

<22> The method for producing a laminated structure according to any one of <19> to <21>, wherein a melt volume-flow rate of the third resin is 14 $cm^3$/10 min or more, the melt volume-flow rate being determined according to ISO 1133.

The laminated structure according to any one of <1> to <16>, the multiple laminated structure according to <17>, the lens according to <18>, and the method for producing a laminated structure according to any one of <19> to <22> can solve the conventionally existing problems in the art and can achieve the object of the present disclosure.

What is claimed is:

1. A laminated structure, comprising:

a first electrically conductive layer;

a first underlying layer comprising a first resin and inorganic particles;

a support comprising a second resin; and a resin layer comprising a third resin that is at least one selected from the group consisting of a resin of same kind as the second resin and a resin having a softening temperature equal to or lower than a softening temperature of the second resin, the first electrically conductive layer, the first underlying layer, the support, and the resin layer being disposed in this order, wherein the first underlying layer is in direct contact with the first electrically conductive layer and the support.

2. The laminated structure according to claim 1, further comprising, a second underlying layer between the support and the resin layer.

3. The laminated structure according to claim 1, wherein a coefficient of thermal expansion of the first underlying layer is smaller than a coefficient of thermal expansion of the support.

4. The laminated structure according to claim 1, wherein the first electrically conductive layer is divided into a plurality of portions.

5. The laminated structure according to claim 1, wherein the first electrically conductive layer comprises an inorganic oxide.

6. The laminated structure according to claim 1, wherein the laminated structure is translucent.

7. The laminated structure according to claim 1, wherein the resin layer is an optical lens.

8. The laminated structure according to claim 1, wherein the second resin comprises at least one selected from the group consisting of polycarbonate, polyethylene terephthalate, polybutylene terephthalate, polymethyl methacrylate, polyethylene, polypropylene, acrylonitrile butadiene styrene, polyoxymethylene, and urethane, or comprises a copolymerized material of foregoing.

9. The laminated structure according to claim 1, wherein the first resin comprises at least one selected from the group consisting of an acrylic resin, an epoxy resin, a urethane resin, a silicone resin, and a melamine resin.

10. The laminated structure according to claim 1, wherein an amount of the inorganic particles in the first underlying layer is 10% by mass or more relative to a total amount of the first resin.

11. The laminated structure according to claim 1, wherein the third resin comprises at least one selected from the group consisting of polycarbonate and a polycarbonate copolymer.

12. The laminated structure according to claim 1, wherein a melt volume-flow rate of the third resin is 14 $cm^3$/10 min or more, the melt volume-flow rate being determined according to ISO 1133.

13. The laminated structure according to claim 1, further comprising:

an electronic material layer provided in contact with the first electrically conductive layer; and second electrically conductive layer provided in contact with the first electronic material layer.

14. The laminated structure according to claim 13, wherein the electronic material layer is an electrochromic layer.

15. The laminated structure according to claim 14, wherein the electrochromic layer comprises an electrochromic portion and a solid electrolyte portion.

16. A multiple laminated structure, comprising:

two laminated structures each of which is the laminated structure according to claim 1, wherein the first electrically conductive layers contained in the two laminated structures face each other via a layer to be sealed, and the multiple laminated structure comprises a seal member comprising the first resin and the inorganic particles, and the seal member is between the two laminated structures, is at a side portion of the two laminated structures, or is between the two laminated structures and at a side portion of the two laminated structures.

17. A lens, comprising:

at least one selected from the group consisting of the laminated structure according to claim 1 and a multiple laminated structure, wherein the multiple laminated structure comprises two laminated structures each of which is the laminated structure;

the first electrically conductive layers contained in the two laminated structures face each other via a layer to be sealed, and the multiple laminated structure comprises a seal member comprising the first resin and the inorganic particles, and the seal member is between the two laminated structures, is at a side portion of the two laminated structures, or is between the two laminated structures and at a side portion of the two laminated structures.

* * * * *